US012344010B2

(12) United States Patent
Arthur et al.

(10) Patent No.: US 12,344,010 B2
(45) Date of Patent: Jul. 1, 2025

(54) MULTI-PRINTHEAD END EFFECTOR AND ASSOCIATED SYSTEM AND METHOD

(71) Applicant: The Boeing Company, Chicago, IL (US)

(72) Inventors: Shane E. Arthur, Kirkland, WA (US); John E. Miller, Amherst, OH (US); Matthew Mellin, Seattle, WA (US); Kjersta Larson-Smith, Seattle, WA (US); Anthony Baker, Gilbertsville, PA (US); Luke Ingram, Summerville, SC (US); Steven Dorris, Willard, MO (US); Jonathan Schwedhelm, Seattle, WA (US); Mark Bunker, Shoreline, WA (US); Ryan Petz, Auburn, WA (US); Travis King, Seattle, WA (US); Matt Christner, Seattle, WA (US); Josiah Brubaker, Bellingham, WA (US); Ryan Siok, Bellingham, WA (US); Wendy Zaballos, Renton, WA (US); Jesse Castleberry, Seattle, WA (US)

(73) Assignee: The Boeing Company, Arlington, VA (US)

( * ) Notice: Subject to any disclaimer, the term of this patent is extended or adjusted under 35 U.S.C. 154(b) by 238 days.

(21) Appl. No.: 18/087,505

(22) Filed: Dec. 22, 2022

(65) Prior Publication Data

US 2024/0208255 A1 Jun. 27, 2024

(51) Int. Cl.
*B41J 25/316* (2006.01)
*B41J 3/407* (2006.01)
*B41J 25/304* (2006.01)

(52) U.S. Cl.
CPC .......... *B41J 25/316* (2013.01); *B41J 3/4073* (2013.01); *B41J 25/304* (2013.01)

(58) Field of Classification Search
CPC ........ B41J 29/02; B41J 3/4073; B41J 25/304; B41J 25/316; B41J 3/543; B41J 2/21;
(Continued)

(56) References Cited

U.S. PATENT DOCUMENTS

| | | | |
|---|---|---|---|
| 6,523,921 | B2 | 2/2003 | Codos |
| 10,220,408 | B2 | 3/2019 | Eng et al. |

(Continued)

FOREIGN PATENT DOCUMENTS

| | | | | |
|---|---|---|---|---|
| CN | 103802502 B | * 5/2017 | | B05C 13/02 |
| EP | 4098371 | 7/2022 | | |
| KR | 20080041095 A | * 5/2008 | | |

OTHER PUBLICATIONS

The future of aircraft printing is digital, Marabu Printing Inks, https://www.youtube.com/watch?v=dl8G1oJqfEs, accessed Dec. 15, 2022.

(Continued)

*Primary Examiner* — Justin Seo
(74) *Attorney, Agent, or Firm* — Kunzler Bean & Adamson

(57) ABSTRACT

An end effector for printing ink on a surface is disclosed. The end effector comprises a primary block comprises a primary-block body. A plurality of primary-printing modules are coupled to the primary-block body and translationally moveable, via a corresponding first actuator. Each one of the primary-printing modules includes at least one printhead which is adjustable, relative to the primary-block body. The printhead may be adjusted by at least one of a second actuator, configured to rotate the printhead about a first axis, or a third actuator, configured to rotate the printhead about a second axis. In some examples, a fourth actuator is configured to rotate at least one printhead, relative to at least one other printhead, about a third axis. Additionally, at least
(Continued)

one trailing block can be coupled to the primary block so that the at least one trailing block is movable relative to the primary block.

28 Claims, 18 Drawing Sheets

(58) Field of Classification Search
CPC .. B41J 29/393; B05B 13/0431; B05B 13/005; B05B 15/68
See application file for complete search history.

(56) References Cited

U.S. PATENT DOCUMENTS

| | | | | |
|---|---|---|---|---|
| 10,773,529 | B2 | 9/2020 | Kerr et al. | |
| 10,875,045 | B2 | 12/2020 | Vasa et al. | |
| 11,045,836 | B2 | 6/2021 | Arthur et al. | |
| 11,141,994 | B2 | 10/2021 | Bullington et al. | |
| 2011/0045836 | A1 | 2/2011 | Hamalainen et al. | |
| 2020/0023658 | A1* | 1/2020 | Ko | B41J 2/2132 |
| 2020/0198338 | A1 | 6/2020 | Riley et al. | |
| 2021/0094221 | A1* | 4/2021 | Smith | B41J 2/145 |
| 2021/0300061 | A1 | 9/2021 | Boniface et al. | |
| 2022/0048478 | A1* | 2/2022 | McGovern | B05B 1/205 |
| 2023/0173804 | A1* | 6/2023 | Hiraga | B41J 25/003 347/14 |

OTHER PUBLICATIONS

Extended European Search Report and Written Opinion for Patent Application No. 23212660.7 dated May 7, 2024.

* cited by examiner

MULTI-PRINTHEAD END EFFECTOR AND ASSOCIATED SYSTEM AND METHOD

FIELD

This disclosure relates generally to an end effector for printing ink on a surface, and more particularly to an end effector having multiple printheads for printing ink on a surface and associated systems and methods.

BACKGROUND

In various commercial products, it is desirable to apply colorful visual images to a surface through the application of a pigmented formulation. The image may be applied to a surface by various methods, such as applying a paint or ink material to a surface using a brush or aerosol spray. However, applying images using a brush or aerosol spray is time-consuming and labor intensive, which can require multiple steps to apply multiple successively applied paint layers. Furthermore, applying images on complex surfaces is difficult and can require a series of masking operations followed by application of the paint or coating. These masking and painting operations are serially repeated until the surface is completed. Performing these processes on large areas with a variety of contoured surfaces requires a significant amount of time and resources.

SUMMARY

The subject matter of the present application has been developed in response to the present state of the art, and in particular, in response to the problems of and needs created or not yet fully solved by conventional printing apparatuses and methods. Generally, the subject matter of the present application has been developed to provide an end effector for printing on a surface, and associated systems and methods, that overcome at least some of the above-discussed shortcomings of prior art techniques.

Disclosed herein is an end effector for printing ink on a surface. The end effector comprises a primary block, which comprises a primary-block body. The primary block also comprises a plurality of primary-printing modules, coupled to the primary-block body, so that each one of the plurality of primary-printing modules is translationally movable, parallel to a z-axis and relative to the primary-block body. The primary block further comprises a first actuator coupled to each one of the plurality of primary-printing modules. The first actuator is operable to selectively extend and retract a corresponding one of the plurality of primary-printing modules, parallel to the z-axis and relative to the primary-block body. Each one of the plurality of primary-printing modules comprises at least one primary printhead. Each one of the plurality of primary-printing modules further comprises at least one of a second actuator or a third actuator. The second actuator is configured to rotate the at least one primary printhead, relative to the primary-block body, about a first axis that is parallel to or collinear with an x-axis, which is perpendicular to the z-axis. The third actuator is configured to rotate the at least one primary printhead, relative to the primary-block body, about a second axis that is parallel to or collinear with a y-axis, which is perpendicular to the x-axis and the z-axis. The preceding subject matter of this paragraph characterizes example 1 of the present disclosure.

Each one of the plurality of primary-printing modules comprises both the second actuator and the third actuator. The preceding subject matter of this paragraph characterizes example 2 of the present disclosure, wherein example 2 also includes the subject matter according to example 1, above.

Each one of the plurality of primary-printing modules further comprises at least two primary printheads. Each one of the plurality of primary-printing modules also comprises a fourth actuator configured to rotate at least one of the at least two primary printheads, relative to at least one other of the at least two primary printheads, about a third axis that is parallel to the second axis. The preceding subject matter of this paragraph characterizes example 3 of the present disclosure, wherein example 3 also includes the subject matter according to any of examples 1-2, above.

Each one of the plurality of primary-printing modules comprises at least three primary printheads. The preceding subject matter of this paragraph characterizes example 4 of the present disclosure, wherein example 4 also includes the subject matter according to example 3, above.

Each one of the plurality of primary-printing modules is selectively movable, via actuation of the first actuator corresponding with each one of the plurality of primary-printing modules, independent of any other one of the plurality of primary-printing modules. The preceding subject matter of this paragraph characterizes example 5 of the present disclosure, wherein example 5 also includes the subject matter according to any of examples 1-4, above.

Each one of the at least one printhead comprises two ink outlets. Each one of the two ink outlets is configured to dispense ink having a color. The color of the ink dispensed by one of the two ink outlets is different than the color of the ink dispensed by any other one of the two ink outlets. The preceding subject matter of this paragraph characterizes example 6 of the present disclosure, wherein example 6 also includes the subject matter according to any of examples 1-5, above.

Each one of the plurality of primary-printing modules further comprises at least three primary printheads. The color of the ink dispensed by any one of the two ink outlets is different than the color of the ink dispensed by any other one of the two ink outlets of any other one of the at least three printheads. The preceding subject matter of this paragraph characterizes example 7 of the present disclosure, wherein example 7 also includes the subject matter according to example 6, above.

The plurality of primary-printing modules comprises at least six primary-printing modules. The preceding subject matter of this paragraph characterizes example 8 of the present disclosure, wherein example 8 also includes the subject matter according to any of examples 1-7, above.

The at least six primary-printing modules are grouped into at least three sets of two primary-printing modules. The two primary-printing modules of each one of the at least three sets of primary-printing modules are aligned in a direction parallel to the y-axis. The two primary-printing modules of each one of the at least three sets of primary-printing modules are offset, in a direction parallel to the x-axis, from the two primary-printing modules of any other one of the at least three sets of two primary-printing modules such that the at least three sets of two primary-printing modules are staggered. The preceding subject matter of this paragraph characterizes example 9 of the present disclosure, wherein example 9 also includes the subject matter according to example 8, above.

The plurality of primary-printing modules are staggered, in a direction parallel to the x-axis, from any other one of the plurality of primary-printing modules. The preceding subject matter of this paragraph characterizes example 10 of the present disclosure, wherein example 10 also includes the subject matter according to any of examples 1-9, above.

The primary block defines at least twenty-four axes of motion. The preceding subject matter of this paragraph characterizes example 11 of the present disclosure, wherein example 11 also includes the subject matter according to any of examples 1-10, above.

The end effector comprises a trailing block coupled with the primary block so that the trailing block is movable relative to the primary block. The trailing block comprises a trailing-block body. The trailing block also comprises a plurality of trailing-printing modules coupled to the trailing-block body so that each one of the plurality of trailing-printing modules is translationally movable, parallel to a second z-axis and relative to the trailing-block body. The trailing block further comprises a fifth actuator coupled to each one of the plurality of trailing-printing modules. The fifth actuator is operable to selectively extend and retract a corresponding one of the plurality of trailing-printing modules, parallel to the second z-axis and relative to the trailing-block body. Each one of the plurality of trailing-printing modules comprises at least one trailing printhead. Each one of the plurality of trailing-printing modules also comprises at least one of a sixth actuator or a seventh actuator. The sixth actuator is configured to rotate the at least one trailing printhead, relative to the trailing-block body, about a fourth axis that is parallel to or collinear with a second x-axis, which is perpendicular to the second z-axis. The seventh actuator is configured to rotate the at least one trailing printhead, relative to the trailing-block body, about a fifth axis that is parallel to or collinear with a second y-axis, which is perpendicular to the second x-axis and the second z-axis. The preceding subject matter of this paragraph characterizes example 12 of the present disclosure, wherein example 12 also includes the subject matter according to any of examples 1-11, above.

Each one of the plurality of trailing-printing modules comprises the sixth actuator and the seventh actuator. The preceding subject matter of this paragraph characterizes example 13 of the present disclosure, wherein example 13 also includes the subject matter according to example 12, above.

Each one of the plurality of trailing-printing modules comprises at least two trailing printheads. Each one of the plurality of trailing-printing modules also comprises an eighth actuator configured to rotate at least one of the two trailing printheads, relative to at least one other of the two trailing printheads, about a sixth axis that is parallel to the fifth axis. The preceding subject matter of this paragraph characterizes example 14 of the present disclosure, wherein example 14 also includes the subject matter according to any of examples 12-13, above.

Each one of the plurality of trailing-printing modules comprises at least three trailing printheads. The preceding subject matter of this paragraph characterizes example 15 of the present disclosure, wherein example 15 also includes the subject matter according to any of examples 12-14, above.

The primary block comprises one of at least one attachment rail or a carriage configured to slidably engage with the at least one attachment rail. The trailing block comprises at least the other one of the at least one attachment rail or the carriage configured to slidably engage with the at least one attachment rail. The carriage comprises a rotary bearing configured to be selectively rotatable about a seventh axis that is parallel to or collinear with the second x-axis. A ninth actuator is coupled to the carriage and operable to selectively extend and retract the trailing block, relative to the primary block, along the at least one attachment rail. A tenth actuator is coupled to the carriage and configured to rotate the trailing block, relative to the primary block, about the seventh axis. The preceding subject matter of this paragraph characterizes example 16 of the present disclosure, wherein example 16 also includes the subject matter according to any of examples 12-15, above.

The end effector comprises a plurality of trailing blocks. The plurality of trailing blocks comprises an upper trailing block coupled to a first portion of the primary block. The plurality of trailing blocks further comprises a lower trailing block coupled to a second portion of the primary block. The first portion is spaced apart from the second portion. The preceding subject matter of this paragraph characterizes example 17 of the present disclosure, wherein example 17 also includes the subject matter according to any of examples 12-16, above.

The upper trailing block and the lower trailing block are positionable in any position, between and inclusive of, a fully-expanded position and a fully-retracted position. When in the fully-expanded position the upper trailing block and the lower trailing block are expanded laterally, relative to the primary block, to form the end effector in a v-block formation. When in the fully-retracted position the upper trailing block and the lower trailing block are retracted laterally, relative to the primary block, to form the end effector in a collapsed formation. The preceding subject matter of this paragraph characterizes example 18 of the present disclosure, wherein example 18 also includes the subject matter according to example 17, above.

The end effector comprises a plurality of trailing blocks. The plurality of trailing blocks comprises a first upper trailing block, a second upper trailing block, a first lower trailing block, and a second lower trailing block. The first upper trailing block is coupled directly to the primary block so that the first upper trailing block is movable relative to the primary block. The second upper trailing block is coupled directly to the first upper trailing block so that the second upper trailing block is movable relative to the first upper trailing block. The first lower trailing block is coupled directly to the primary block so that the first lower trailing block is movable relative to primary block. The second lower trailing block is coupled directly to the first lower trailing block so that the second lower trailing block is movable relative to the first lower trailing block. The preceding subject matter of this paragraph characterizes example 19 of the present disclosure, wherein example 19 also includes the subject matter according to any of examples 12-18, above.

Each one of the plurality of trailing blocks is selectively movable, via actuation of a corresponding one of a plurality of ninth actuators or a corresponding one of a plurality of tenth actuators, independent of any other one of the plurality of trailing blocks. The preceding subject matter of this paragraph characterizes example 20 of the present disclosure, wherein example 20 also includes the subject matter according to example 19, above.

The end effector defines at least sixty-four axes of motion. The preceding subject matter of this paragraph characterizes example 21 of the present disclosure, wherein example 21 also includes the subject matter according to any of examples 12-20, above.

Each one of the plurality of trailing-printing modules is selectively movable, via actuation of the fifth actuator corresponding with each one of the plurality of trailing-printing modules, independent of any other one of the plurality of trailing-printing modules. The preceding subject matter of this paragraph characterizes example 22 of the present disclosure, wherein example 22 also includes the subject matter according to any of examples 12-20, above.

The plurality of trailing-printing modules are staggered, in a direction parallel to the second x-axis, from any other one of the plurality of trailing-printing modules. The preceding subject matter of this paragraph characterizes example 23 of the present disclosure, wherein example 23 also includes the subject matter according to any of examples 12-21, above.

Further disclosed herein is a system for printing ink on a surface. The system comprises a manipulator. The system also comprises an end effector removably attachable to the manipulator. The end effector comprises a primary block which comprises a primary-block body. The primary block also comprises a plurality of primary-printing modules coupled to the primary-block body so that each one of the plurality of primary-printing modules is translationally movable, parallel to a z-axis and relative to the primary-block body. The primary block further comprises a first actuator coupled to each one of the plurality of primary-printing modules. The first actuator is operable to selectively extend and retract a corresponding one of the plurality of primary-printing modules, parallel to the z-axis and relative to the primary-block body. Each one of the plurality of primary-printing modules comprises at least one primary printhead. Each one of the plurality of primary-printing modules also comprises at least one of a second actuator or a third actuator. The second actuator is configured to rotate the at least one primary printhead, relative to the primary-block body, about a first axis that is parallel to or collinear with an x-axis, which is perpendicular to the z-axis. The third actuator is configured to rotate the at least one printhead, relative to the primary-block body, about a second axis that is parallel to or collinear with a y-axis, which is perpendicular to the x-axis and the z-axis. The system further comprises a control system coupled to the end effector. The control system is configured to receive data corresponding to at least a location of the primary block, relative to the surface, and to control a position of the primary block, relative to the surface and via selective control of the manipulator, in response to the data. The preceding subject matter of this paragraph characterizes example 24 of the present disclosure.

The control system is configured to receive second data corresponding to a location of each one of the plurality of primary-printing modules, relative to the surface. The control system is also configured to control a position of the at least one primary printhead of the corresponding one of the primary-printing modules, relative to the surface, based at least partially on the second data. The preceding subject matter of this paragraph characterizes example 25 of the present disclosure, wherein example 25 also includes the subject matter according to example 24, above.

The end effector comprises at least one trailing block coupled to the primary block so that the at least one trailing block is movable relative to the primary block. The at least one trailing block comprises a trailing-block body. The at least one trailing block also comprises a plurality of trailing-printing modules coupled to the trailing-block body so that each one of the plurality of trailing-printing modules is translationally movable, parallel to a second z-axis and relative to the trailing-block body. The trailing block further comprises a fifth actuator coupled to each one of the plurality of trailing-printing modules. The fifth actuator is operable to selectively extend and retract a corresponding one of the plurality of trailing-printing modules, parallel to the second z-axis and relative to the trailing-block body. Each one of the plurality of trailing-printing modules comprises at least one trailing printhead. Each one of the plurality of trailing-printing modules also comprises at least one of a sixth actuator and a seventh actuator. The sixth actuator is configured to rotate the at least one trailing printhead, relative to the trailing-block body, about a fourth axis that is parallel to or collinear with a second x-axis, which is perpendicular to the second z-axis. The seventh actuator is configured to rotate the at least one trailing printhead, relative to the trailing-block body, about a fifth axis that is parallel to or collinear with a second y-axis, which is perpendicular to the second x-axis and the second z-axis. The control system of the system is further configured to receive third data corresponding to at least a location of the at least one trailing block, relative to the surface, and to control a position of the at least one trailing block, relative to the surface, via selective control of the manipulator, in response to the third data. The preceding subject matter of this paragraph characterizes example 26 of the present disclosure, wherein example 26 also includes the subject matter according to any of examples 24-25, above.

The control system is further configured to receive fourth data corresponding to a location of each one of the plurality of trailing-printing modules, relative to the surface. The control system is also configured to control a position of the corresponding at least one printhead, relative to the surface, based at least partially on the fourth data. The preceding subject matter of this paragraph characterizes example 27 of the present disclosure, wherein example 27 also includes the subject matter according to any of examples 24-26, above.

The control system is configured to receive a print path. The print path defines a path the end effector will follow along the surface. The control system is further configured to adjust the print path, in real time, based at least partially on the data corresponding to at the least the location of the primary block, relative to the surface. The preceding subject matter of this paragraph characterizes example 28 of the present disclosure, wherein example 28 also includes the subject matter according to any of examples 24-27, above.

Further disclosed herein is a method of printing ink on a surface. The method comprises the step of positioning an end effector relative to the surface. The end effector comprising a primary block comprising a primary-block body and a plurality of primary-printing modules. The plurality of primary-printing modules are coupled to the primary-block body so that each one of the plurality of primary-printing modules is translationally movable, parallel to a z-axis and relative to the primary-block body. Each one of the plurality of primary-printing modules comprises at least one primary printhead. The method also comprises the step of receiving a location data for each one of the plurality of primary-printing modules and the at least one primary printhead. At least one of adjusting a position of at least one of the plurality of primary-printing modules, in response to the location data for each one of the plurality of primary-printing modules, or adjusting a position of the at least one primary printhead, in response to the location data of the at least one primary printhead is adjusted. The plurality of primary-printing modules are adjustable, relative to the primary-block body, to extend or retract at least one of the plurality of primary-printing modules, parallel to the z-axis so that the at least one plurality of primary-printing modules is a desired distance away from the surface. The at least one primary printhead is adjustable so that the at least one primary printhead is a desired distance away from the surface by rotating the at least one primary printhead in at least one manner. The at least one primary printhead may be adjusted by rotating the at least one primary printhead, relative to the primary-block body, about a first axis that is parallel to or collinear with an x-axis, which is perpendicular to the z-axis. Additionally, or alternatively, the at least one primary printhead may be adjusted by rotating the at least one primary printhead, relative to the primary-block body, about a second axis that is parallel to or collinear with a y-axis, which is perpendicular to the x-axis and the z-axis. The method also comprises the step of moving the end effector along the surface. The method further comprises the step of painting ink, via the at least one primary printhead, on the surface as the end effector is moved along the surface. The preceding subject matter of this paragraph characterizes example 29 of the present disclosure.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Figure 1:
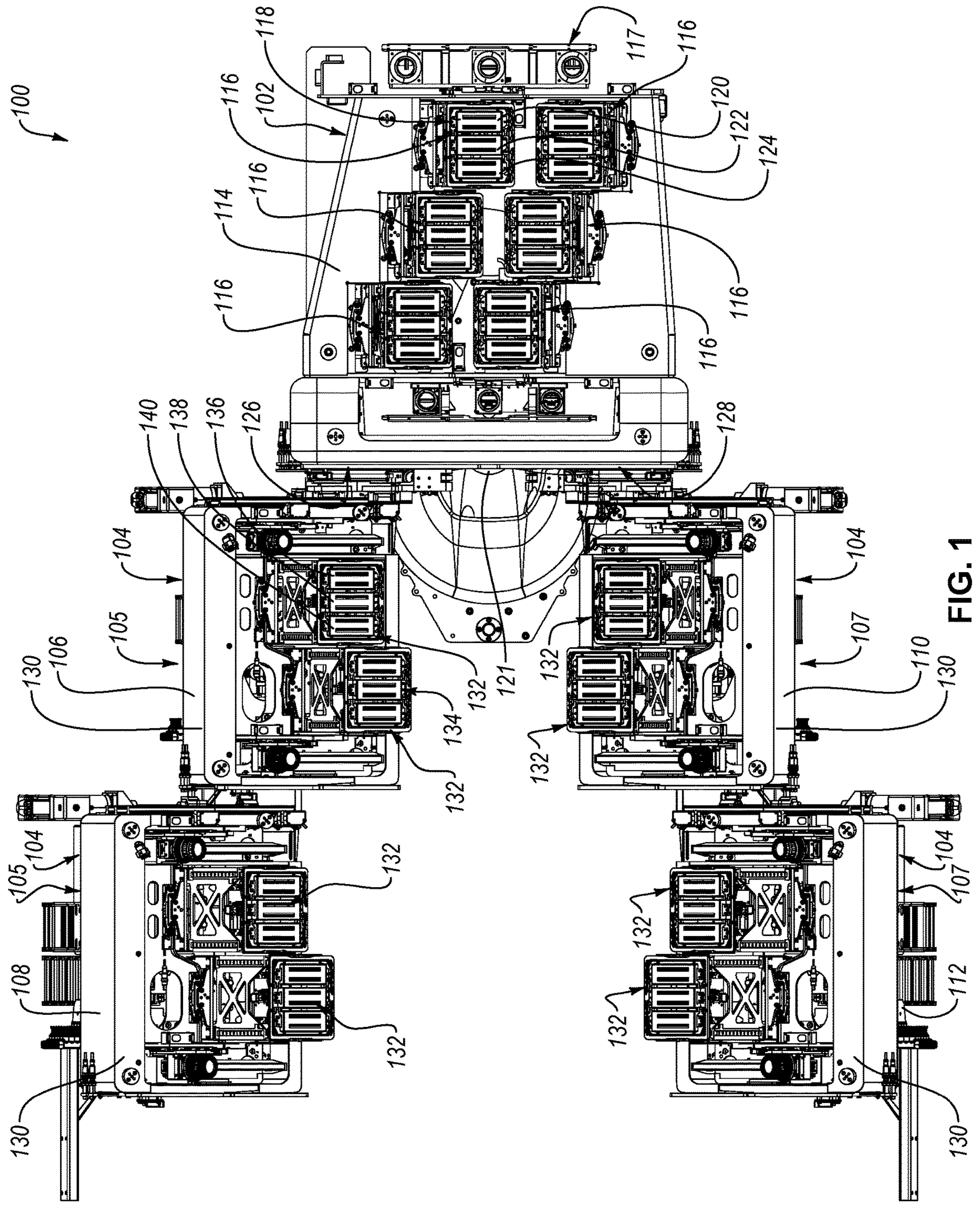
FIG. 1 is a schematic perspective view of an end effector, with a primary block and four trailing blocks, according to one or more examples of the present disclosure.

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of an end effector, and associated systems and methods, for printing ink on a surface. The following provides some features of at least some examples of the end effector. The end effector includes a plurality of printheads configured to enable wide-area printing coverage on a surface. Additionally, the end effector is useful for wide-area printing on complex surfaces, such as a contoured surfaces or compound contoured surfaces, as each printhead is adjustable relative to at least one axis. In some cases, the end effector includes one block (i.e., a primary block) with a plurality of printheads that are adjustable through multiple axes of movement to maintain the printheads a desired distance from the surface during use of the end effector. In other cases, the end effector includes at least one additional block (i.e., trailing block) that is coupled to the primary block. Each trailing block also includes a plurality of printheads that are adjustable through multiple axes of movement. The trailing block(s) are designed to move (e.g., expand or retract) laterally, relative to the primary block, allowing the end effector to telescope narrower and wider for optimal printing coverage over a surface in a single pass. Additionally, due to the adjustability each printhead of the primary block and any additional trailing blocks, the end effector can be adjusted to accommodate printing on contoured surfaces while maintaining each printhead a desired distance from the surface during use of the end effector.

During a printing process, the end effector is enabled to cover a wide area of a surface in a single pass, and to adjust the lateral expansion or coverage of the end effector, during the single pass, to avoid collisions with any obstructions or features on the surface. The ability to change the macro-contour of the end effector enables the end effector to adjust to match a changing contour of the surface.

One non-limiting use of the end effector is for printing a decorative livery coating on the surface of an aircraft. The decorative livery coating creates a decorative design on the surface of the aircraft, which helps to identify and distinguish one aircraft from another. The surface of an aircraft is complex with various features, such as wings, stabilizers, window openings, engines, etc., that can obstruct a print path of the end effector. Additionally, the surface of an aircraft fuselage is often a complex contoured surface. In order to print the surface of an aircraft efficiently, the end effector can be used to minimize the number of print passes necessary to print the surface, as well as to reduce time and labor.

Referring to FIG. 1, one example of an end effector 100 is shown. The end effector 100 includes a primary block 102, which supports multiple primary printheads 118 and is configured to be attachable to a manipulator, via a mount 115 (see, e.g., FIG. 2) allowing the end effector 100 to be maneuverable about a surface. As used herein a manipulator is any device that is capable of moving the end effector 100 relative to a surface with sufficient degrees of freedom to position the end effector 100 in such a way that ink can be printed on the surface. In some examples, the manipulator is a robot with an articulating arm. The primary block 102, shown separately in FIG. 3, includes a primary-block body 114 and a plurality of primary-printing modules 116 coupled to the primary-block body 114. Each one of the plurality of primary-printing modules 116 is translationally movable, parallel to a z-axis and relative to the primary-block body 114. That is, when the end effector 100 is in use on a surface, the z-axis is perpendicular to the surface and the primary-printing modules 116 are translationally movable towards the surface and away from the surface. As used herein, a direction is parallel to an axis when the direction defines a direction vector that is either collinear with the axis, or side-by-side with the axis so that a distance between the direction vector and the axis is continuously the same.

In some examples, the primary block 102 includes at least two primary-printing modules 116. The plurality of primary-printing modules 116 can be arranged on the primary block 102 in any arrangement. In some examples, the plurality of primary-printing modules 116 are linearly aligned in a direction parallel to an x-axis, which is perpendicular to the z-axis. As used herein, the x-axis is parallel to or collinear with a print path of the end effector 100 when the end effector 100 is in use on a surface and following the print path. In other examples, as shown in FIG. 1, at least one of the plurality of primary-printing modules 116 is not linearly aligned (i.e., staggered) in a direction parallel to the x-axis, with at least one other one of the plurality of primary-printing modules 116. For example, at least two of the plurality of primary-printing modules 116 are linearly aligned, while at least another one of the plurality of primary-printing modules 116 is not linearly aligned with the at least two of the plurality of primary-printing modules 116. In yet other examples, each one of the plurality of primary-printing modules 116 is staggered, in a direction parallel to the x-axis, from any other ones of the plurality of primary-printing modules 116, such that no primary-printing modules 116 are linearly aligned in a direction parallel to the x-axis (see, e.g., FIG. 1).

In some examples, the primary block 102 includes at least six primary-printing modules 116. The at least six primary-printing modules 116 can be arranged in any arrangement. For example, the at least six primary-printing modules 116 can be grouped into at least three sets of two primary-printing modules 116, such that the at least three sets of primary-printing modules 116 are aligned in a direction parallel to the y-axis, perpendicular to the x-axis. Each one of the sets of two primary-printing modules 116 are offset (i.e., not linearly aligned), in a direction parallel to the x-axis, from the two primary-printing modules 116 of any other one of the at least three sets of two primary-printing modules 116. Accordingly, the at least three sets of two primary-printing modules 116 are staggered, in the direction parallel to the x-axis, as shown in FIG. 1.

Each one of the primary-printing modules 116 includes at least one primary printhead 118 configured to print ink on a surface. In some examples, the primary-printing modules 116 include at least three primary printheads 118, such as a first primary printhead 120, a second primary printhead 122, and a third primary printhead 124. In some examples, each one of the primary printheads 118 is or includes an inkjet head, which can be a piezo jet, thermal jet, continuous jet, and/or valve jet printhead. As used herein, ink can be any pigmented formulation which can be applied to a surface, such as an ink, water-based paint, oil-based paint, primer, coatings, varnish, etc. Each one of the primary printheads 118 is configured to print ink having a color (which includes white or black). Additionally, the ink may be opaque or translucent, such as a varnish or clear coat that is applied over the surface to add protection to the surface.

In some examples, at least two primary printheads 118 of a corresponding primary-printing module 116 print a color of ink having the same color. For example, a first primary printhead 120 may print a first coat of a color of ink and a second primary printhead 122 may print a second coat of the same color of ink. In other examples, each one of the primary printheads 118 of the corresponding primary-printing module 116 prints ink having a different color than ink printed by any other one of the primary printheads 118 of the primary-printing module 116. The primary printhead 118, in some examples, may have more than one ink outlet 119, each ink outlet 119 configured to dispense ink from the primary printhead 118 to a surface. For example, the primary printhead 118 may have two ink outlets 119 and the color of ink dispensed by one of the two ink outlets 119 may be different than the color of ink dispensed by the other one of the two ink outlets 119. In other examples, the color of ink dispensed by each ink outlets 119 of each one of the primary printheads 118 on a corresponding primary-printing module 116 is different than the color of the ink dispensed by any other one of the ink outlets 119 of each one of the primary printheads 118. In other words, a primary-printing module 116 with multiple ink outlets 119 may be configured to print multiple colors of ink, with each ink outlet 119 printing a distinct color. Various color and/or print systems can be used for printing on the surface. For example, CMYK (i.e., cyan, magenta, yellow, and key, as in black), RGB (i.e., red, green and blue) or expanded color systems can be used. It is possible for the end effector 100 to print single-color, multi-color images, chromatic images, grey-stage images, monochrome, binary images, etc.

The end effector 100 additionally includes, in some examples, at least one trailing block 104, which supports at least one trailing printhead 134 and is configured to be coupled to the primary block 102 so that the at least one trailing block 104 is movable relative to the primary block 102. The at least one trailing block 104, shown separately in FIGS. 11 and 12, includes a trailing-block body 130 and a plurality of trailing-printing modules 132 coupled to the trailing-block body 130. Each one of the trailing-printing modules 132 is translationally movable, parallel to a second z-axis and relative to the trailing-block body 130. That is, when the end effector 100 is in use on a surface, the second z-axis is perpendicular to the surface and the trailing-printing modules 132 are translationally movable towards the surface and away from the surface. As used herein, a first coordinate system (i.e., the x-axis, the y-axis, and the z-axis) is fixed, relative to the primary block 102, and a second coordinate system (i.e., a second x-axis, a second y-axis, and the second z-axis) is fixed, relative to the trailing block 104. Each additional trailing block 104 of the end effector 100, has an individual and correlated coordinate system. The x-axis and the second x-axis remain parallel or collinear to each other when the end effector 100 is in use on a surface. However, the z-axis and second z-axis can be parallel or non-parallel, such as when the end effector 100 is on a contoured surface.

The at least one trailing block 104 includes at least two trailing-printing modules 132. The plurality of trailing-printing modules 132 can be arranged on the at least one trailing block 104 in any arrangement. In some examples, the plurality of trailing-printing modules 132 are linearly aligned in a direction parallel to the second x-axis, which is perpendicular to the second z-axis. In other examples, each one of the plurality of trailing-printing modules 132 are staggered, in a direction parallel to the second x-axis, from any other ones of the plurality of trailing-printing modules 132, such that no trailing-printing modules 132 are linearly aligned in the direction parallel to the second x-axis.

Similar to that described above in relation to the primary-printing modules 116, each one of the trailing-printing modules 132 includes at least one trailing printhead 134 configured to print ink on a surface. In some examples, each trailing-printing module 132 includes at least three trailing printheads 134, such as a first trailing printhead 136, a second trailing printhead 138, and a third trailing printhead 140.

The at least one trailing block 104, in some examples, can be an upper trailing block 105, configured to be movably coupled directly to a first portion 126 of the primary block 102 and/or a lower trailing block 107, configured to be movably coupled directly to a second portion 128 of the primary block 102. The first portion 126 is spaced apart from the second portion 128 along a trailing side 121 of the primary block 102. The end effector 100 can have multiple upper trailing blocks 105 (and/or multiple lower trailing blocks 107), where a first upper trailing block 106 is configured to be movably coupled to the primary block 102 and subsequent upper trailing blocks 105 are configured to be movably coupled to the immediately adjacent upper trailing block 105, such that only one upper trailing block 105 is directly coupled to the primary block 102. As shown in FIG. 1, for example, the end effector 100 includes a first upper trailing block 106 coupled to the primary block 102 so that the first upper trailing block 106 is movable relative to the primary block 102, and a second upper trailing block 108 coupled to the first upper trailing block 106 so that the second upper trailing block 108 is movable relative to the first upper trailing block 106. Likewise, a first lower trailing block 110 is coupled to the primary block 102 so that the first lower trailing block 110 is movable relative to the primary block 102, and a second lower trailing block 112 is coupled to the first lower trailing block 110 so that the second lower trailing block 112 is movable relative to the first lower trailing block 110. Additional trailing blocks 104 can be added to the end effector 100 if desired, to achieve a larger end effector 100, or an end effector 100 capable of printing a wider print path. In this manner, the end effector 100 is easily scalable to provide customizable print paths.

Figure 2:
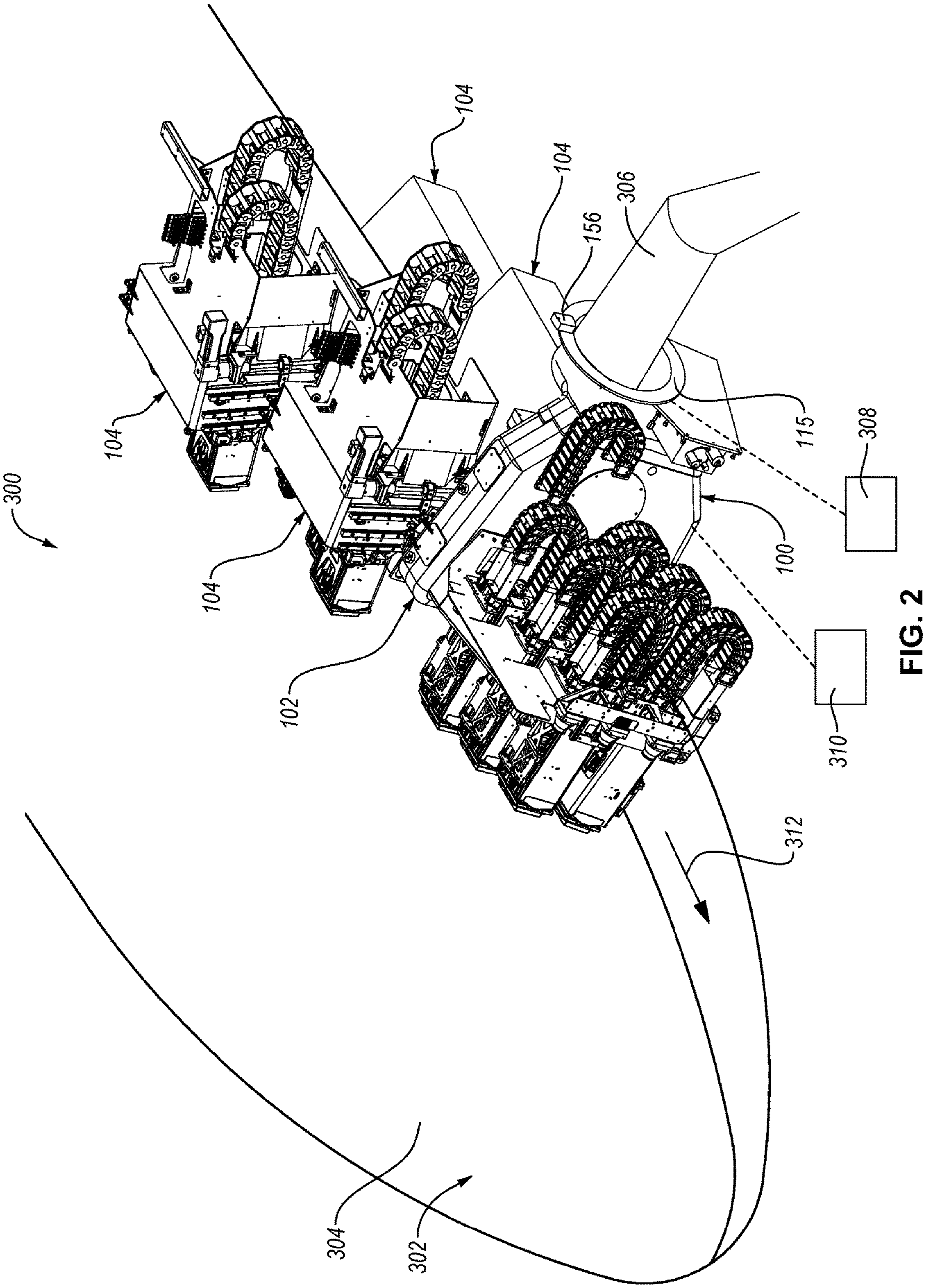
FIG. 2 is a schematic perspective view of the end effector of FIG. 1 printing ink on a surface of an object, according to one or more examples of the present disclosure.

One example of a system 300 for printing on a surface 302 is shown in FIG. 2. The system 300 includes a manipulator having a manipulator arm 306, with the end effector 100 removably attached to the manipulator arm 306 via the mount 115. The manipulator arm 306 is configured to be selectively movable, relative to the surface 302. Accordingly, when attached, the manipulator arm 306 can move the end effector 100 along a print path 312, such as translationally along the print path 312. It is noted that the end effector 100 can move along the print path 312 with the primary block 102 as the leading block (i.e., first block), however, in other cases, the end effector 100 can move along the print path 312 with an outermost trailing block 104 as the leading block. When the primary block 102 is the leading block, the at least one primary printheads 118 or multiple aligned, relative to the y-axis, primary printheads 118, that are adjacent to the leading side 117 are configured to be the first primary printheads to potentially print ink on the surface 302 in a given pass along the surface 302. Furthermore, in some examples, the first printhead to potentially print ink is a trailing printhead 134, adjacent to a second trailing side 133 of the outermost trailing block 104, relative to the primary block 102, when the printing pass is along the print path 312 in the opposite direction, such that the outermost trailing block is the leading block. Additionally, the manipulator arm 306 may be configured to be selectively rotatable relative to the surface 302, such that the end effector 100 can follow a print path 312 that is non-linear.

The surface 302 can be any surface 302 of any object that is capable of being printed. In some cases, the object to be printed has a three-dimensional body with a surface 302 having at least one obstruction, contour, bend, opening, angle, etc. For example, the object may be a vehicle such as a land-based, water-based, aircraft and/or space vehicle. Additionally, the object may be a non-vehicle commercial product such as home appliances, computers, furniture, toys, etc. As shown, the object is an aircraft having a fuselage surface 304 to be printed. The end effector 100 having a primary block 102 and four trailing blocks 104 is moving along the print path 312 on the fuselage surface 302. The aircraft may have one or more areas where it is difficult and/or time consuming to apply ink to the surface using conventional methods. Such areas, may include the contoured fuselage surface 304 and areas around wings, stabilizers, engines, etc. The end effector 100, with its ability to expand and retract laterally, as well as, the ability to adjust printhead location and angularity, allows the end effector 100 to print ink to the fuselage surface 304 in an efficient manner, continuing movement along the print path 312 while avoiding possible collisions.

The system 300 further includes a control system 308 communicatively coupled to the end effector 100. The control system 308 is configured to receive data corresponding to at least a location of the primary block 102, relative to the surface 302, and to control a position of the primary block 102, relative to the surface 302 and via selective control of the manipulator arm 306, in response to the data. Accordingly, the control system 308 is configured to receive location data and use at least the location data to control a position of the primary block 102 along the print path 312. The control system 308 can be described as being communicatively connected with various components. Communicatively connected refers to any type of communication and/or connection between the components that allows the component to pass and/or receive signals and/or information from another component. The communication may be along any signal path, whether a wired or a wireless connection. The control system 308 may include, or be part of, a computing device that may include one or more processors, memory, and one or more communication interfaces.

In some examples, the control system 308 is also configured to receive second data corresponding to a location of each one of the plurality of primary-printing modules 116, relative to the surface 302. The control system 308 is configured to control a position of the at least one primary printhead 118 of the corresponding one of the primary-printing modules 116, relative to the surface 302, based at least partially on the second data. The control system 308 employs at least one actuator coupled to the primary-printing module 116 to control the position of the at least one primary printhead 118. Additionally, in some examples, the control system 308 is configured to receive third data corresponding to at least a location of at least one trailing block 104, relative to the surface 302. The control system 308 can control a position of the at least one trailing block 104, relative to the surface 302, via selective control of the manipulator arm 306, and selective control of a ninth and ten actuators (see, e.g., FIG. 12), in response to the third data.

In yet other examples, the control system 308 is further configured to receive fourth data corresponding to a location of each one of the plurality of trailing-printing modules 132, relative to the surface 302. The control system 308 is configured to control a position of the corresponding at least one trailing printhead 134, relative to the surface 302, based at least partially on the fourth data. The control system 308 employs at least one actuator coupled to the trailing-printing module 132 to control the position of the at least one trailing printhead 134. The control system receives data, such as the second data, third data, and the fourth data, through a plurality of sensors, as described below in reference to FIG. 3.

The system 300 also includes an ink delivery system 310 configured to deliver ink, to each one of the primary printheads 118 of the primary block 102 and each one of the trailing printheads 134 of any trailing blocks 104 coupled to the primary block 102. The ink delivery system 310 may be directly coupled to the end effector 100, such as physically attached to the end effector 100 or indirectly coupled to the end effector 100, through a series of tubes that feed ink to the end effector 100 from an ink delivery system 310 that is separate from the end effector 100.

Figure 3:
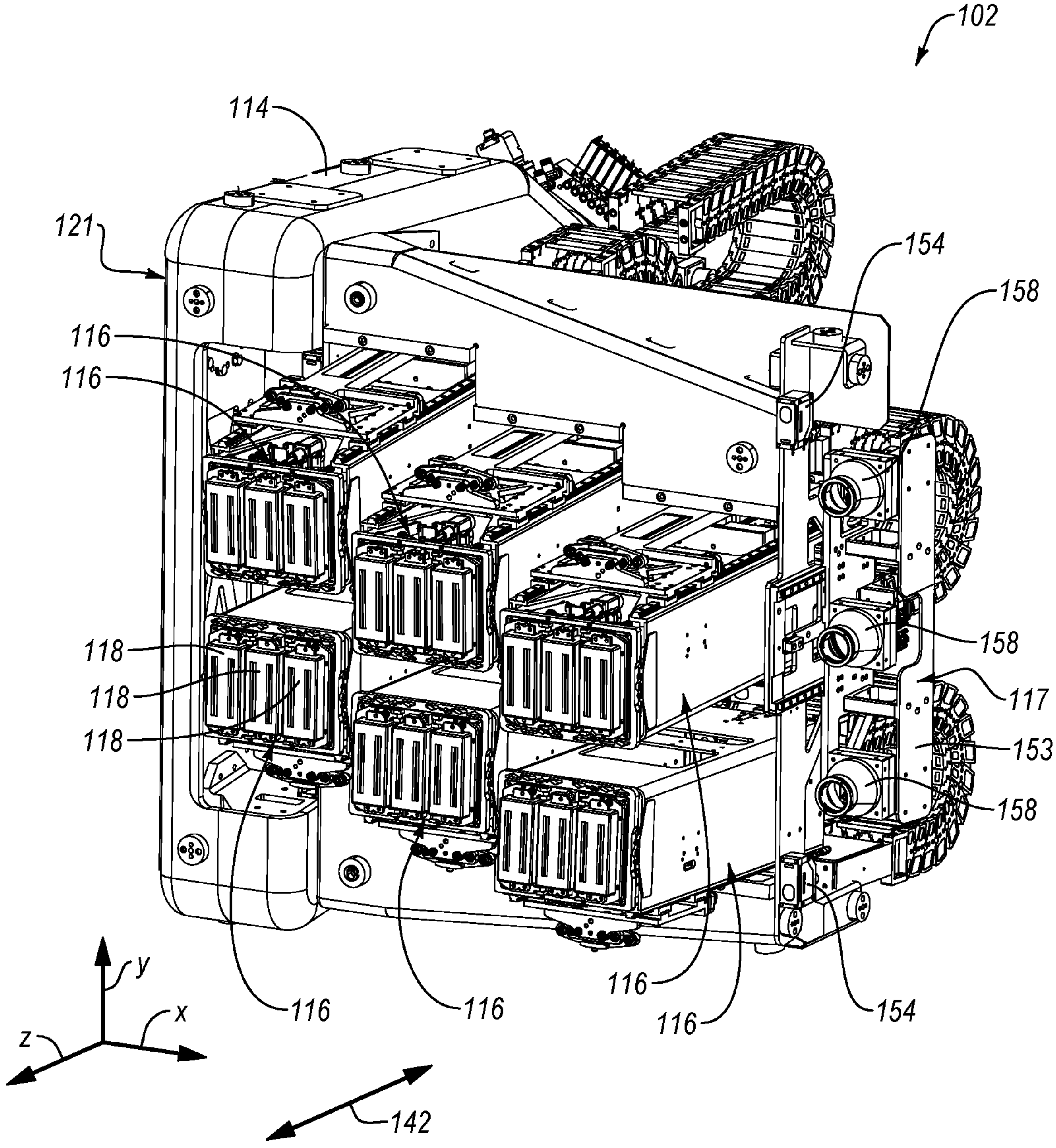
FIG. 3 is a schematic perspective view of a primary block of the end effector of FIG. 1, according to one or more examples of the present disclosure.
Figure 4:
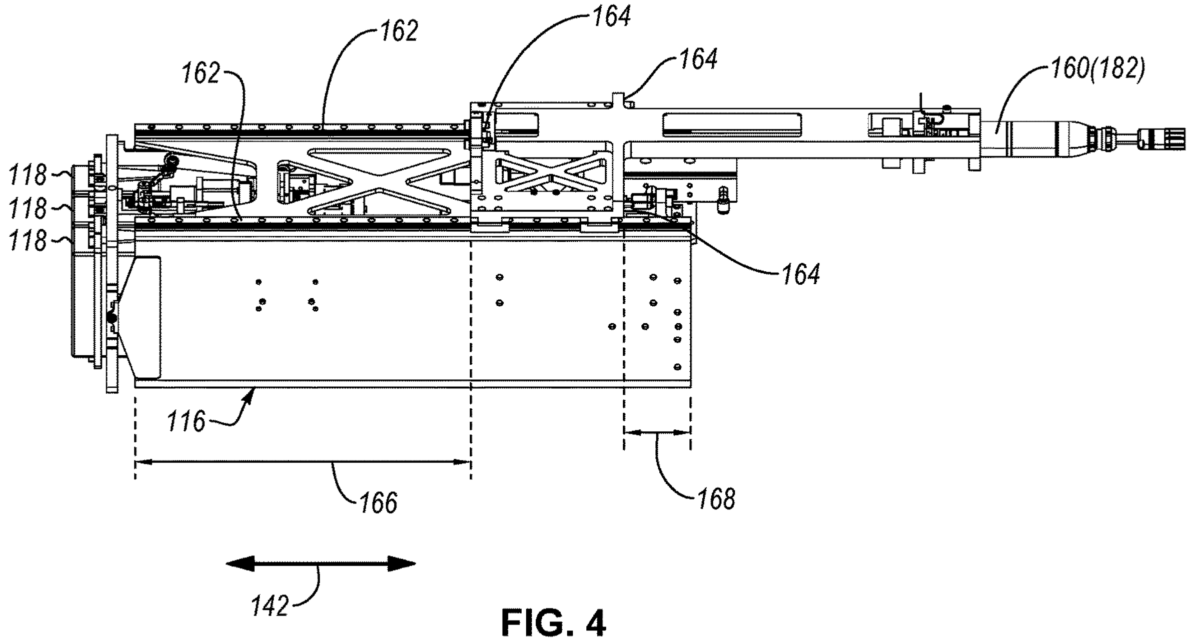
FIG. 4 is a schematic perspective view of a primary-printing module and a first actuator of the primary block of FIG. 3, according to one or more examples of the present disclosure.
Figure 5:
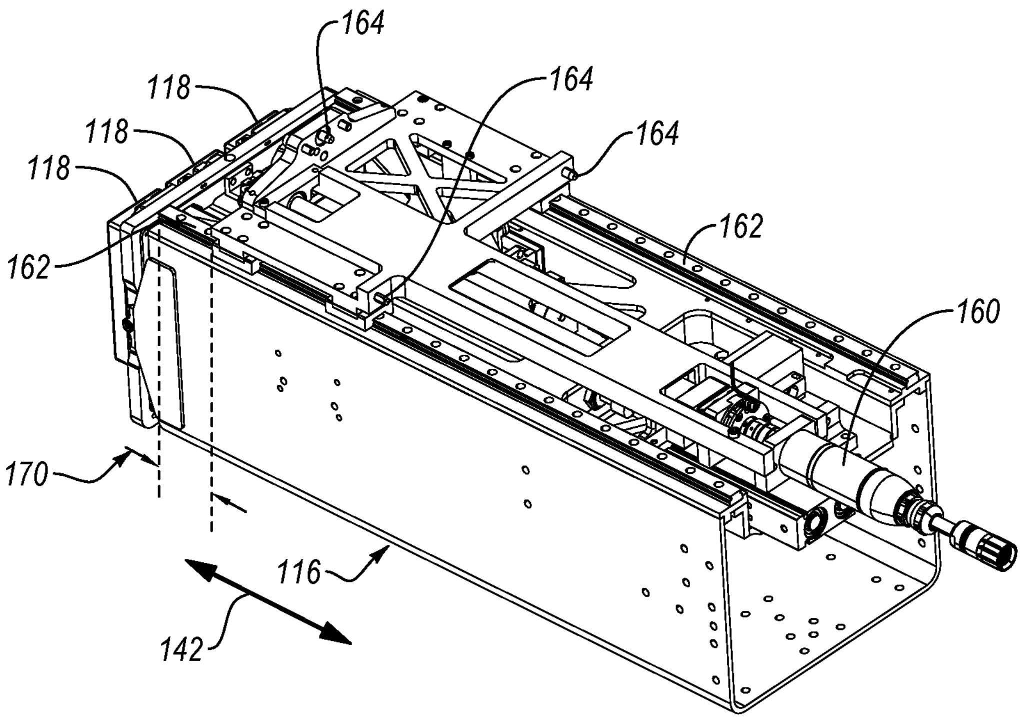
FIG. 5 is a schematic perspective view of the primary-printing module and the first actuator of the primary block of FIG. 3, with the first actuator in a retracted position, according to one or more examples of the present disclosure.

Referring to FIG. 3, the primary block 102 includes six primary-printing modules 116. Each one of the primary-printing modules 116 moves translationally in seventh directions 142, parallel to the z-axis, and relative to the primary-block body 114 via a first actuator 160. The first actuator 160, shown in FIGS. 4 and 5, is coupled to each one of the primary-printing modules 116 and operable to selectively extend and retract a corresponding one of the primary-printing modules 116. The first actuator 160 is movably (e.g., slidably) coupled to the primary-printing modules 116 via at least one linear rail 162, which is non-movably fixed to a corresponding one of the primary-printing modules 116. When actuated, the first actuator 160 is configured to move the corresponding primary-printing module 116, relative to the primary-block body 114, parallel to the z-axis, such that when the end effector 100 is on a surface, the corresponding primary-printing module 116 is moved towards or away from the surface. Each one of the primary-printing modules 116 is selectively movable, independent of any other one of the plurality of primary-printing modules 116. Accordingly, the first actuators 160 are configured to independently adjust the locations of the plurality of primary-printing modules 116 to conform to and follow a variety of surface geometries (e.g., convex/concave surfaces) encountered along a complex surface. The first actuator 160 (and any other actuator described below) can be any of various actuator devices that are capable of moving the primary-printing module 116. For examples, a linear actuator, such as a stepper motor with a lead screw which produces motion along a linear path, may be used.

The primary-printing module 116 may be in a neutral position, for example. The position of the primary-printing module 116 shown in FIG. 4 is an example of a neutral position. Once actuated, the first actuator 160 can retract the primary-printing modules 116 to any position along a first distance 166. Alternatively, once actuated, the first actuator 160 can extend the primary-printing module 116 to any position along a second distance 168. In some examples, the primary-printing module 116 includes an emergency retraction system. The emergency retraction system can be used to quickly retract the primary-printing module 116 to avoid a collision, as such, the first distance 166 further includes an emergency retraction distance 170, as shown in FIG. 5 at a forward end of the first distance 166. The emergency retraction system can be employed to maximum the reaction time to retract the primary-printing module along the emergency retraction distance 170, to avoid an immediate collision.

The primary-printing module 116 also includes a plurality of attachment points 164, such as fasteners, round pins, diamond pins, screws, etc., to attach the primary-printing module 116 to the primary-block body 114. The fasteners may allow the primary-printing modules 116 to be removed temporarily from the primary-block body 114 for maintenance, repair, or replacement. Furthermore, in some examples, certain ones of the plurality of primary-printing modules 116 can be removed from the end effector 100 so that certain ones of the plurality of primary-printing modules 116 are not on the end effector 100 during use of the end effector 100. This may be useful to avoid overlapping printed paths from previously aligned primary-printing modules 116.

The trailing-printing modules 132 have the same features and functionality as the primary-printing modules 116. Accordingly, a fifth actuator, similar to the first actuator 160, is movably (e.g., slidably) coupled to each trailing-printing module 132 on each trailing block 104 of the end effector 100. When actuated the fifth actuator is operable to selectively extend and retract a corresponding one of the trailing-printing modules 132, parallel to the second z-axis and relative to the trailing-block body.

Referring back to FIG. 3, in some examples, the primary block 102 includes a plurality of sensors. The plurality of sensors are configured to provide location data and measurement data for the end effector 100. The plurality of sensors may include but are not limited to cameras 158, laser distance sensors 154, accelerometers 156, encoders, and controllers. In some examples, an encoder and controller is coupled to each primary printhead 118 or each one of the plurality of primary-printing modules 116 (not shown). Each encoder is configured to measure and receive location data for the corresponding primary printhead 118 or primary-printing module 116. Furthermore, each controller is configured to control the movement of the corresponding primary printhead 118 or corresponding one of the primary-printing modules 116, based on the location data from the corresponding encoder. In other examples, encoders and controllers can be shared between at least two primary printheads 118 or primary-printing modules 116. For example, one encoder may be configured to measure and receive the location data for a primary-printing module 116 and the primary printhead 118 of the same primary-printing module 116. Likewise, one controller may be configured to control the movement of the primary-printing module 116 and the primary printhead 118 of the same primary-printing module 116.

Additionally, or alternatively, the primary block 102 has at least one camera 158, for imaging a surface on which the end effector 100 is currently printing, where the images provide location data. Real-time adjustments can be performed to the print path of the end effector 100 or to various parts of the primary block 102 based on the location data generated by the camera 158. In one example, a plurality of cameras 158, such as three cameras, are coupled to the primary-block body 114, adjacent to a leading side 117 of the primary block 102. In other examples, a plurality of cameras 158, such as three cameras, are coupled to the primary-block body 114, adjacent to a trailing side 121 of the primary block 102. In yet other examples, a plurality of camera 158 are along both the leading side 117 and the trailing side 121 of the primary-block body 114. The camera 158 may be any camera capable of imaging a surface, such as a 4 k or 8 k camera. If more than one camera 158 is employed on the primary block 102, each camera can be identical or at least two different cameras can be used, such a one 4 k camera and one 8 k camera. The camera 158 may be adjustable, such that the field of view of the camera can be adjusted. The primary block 102 may also include at least one illuminator 153 configured to provide illumination (i.e., light) to the surface the end effector 100 is imaging. The at least one illuminator 153, in some examples, is offset from the camera 158, such that the illuminator 153 is adjacent to the camera, in a direction parallel to the x-axis. In other examples, the illuminator 153 is aligned with the camera 158, such that the camera 158 and the illuminator 153 are co-planar in a direction perpendicular to the x-axis. One illuminator 153 can be shared by all of the cameras 158 adjacent to the leading side 117 (or trailing side 121), or each camera 158 may have an individually corresponding illuminator 153.

The primary block 102 may also include at least one laser distance sensor 154 configured to measure a distance from the sensor to a surface. The distance data from the laser distance sensor can be used to determine the distance various parts of the primary block 102 are from the surface. For example, at least one laser distance sensor 154 may be located adjacent to the leading side 117 of the primary block 102 and configured to measure the distance from the leading side 117 of the primary block 102 to the surface. Additionally, or alternatively, at least one laser distance sensor 154 may be located adjacent to the trailing side 121 of the primary block 102 and configured to measure the distance from the trailing side 121 of the primary block 102 to the surface. Laser distance sensors 154 may also be associated with individual primary printheads 118 or individual primary-printing modules 116. The primary block 102, in some examples, may also include at least one accelerometer 156, such as the accelerometer 156 located near the mount 115 of the primary block (see, e.g., FIG. 13). The at least one accelerometer 156 is used to detect an orientation of the primary block 102, relative to the surface. The control system 308 can utilize the plurality of sensors to receive data corresponding to at least one of the location of the primary block 102, a primary-printing module 116, individual primary printheads 118 of a corresponding primary-printing module 116, trailing blocks 104, trailing-printing modules 132 and individual trailing printheads 134 of a corresponding trailing-printing module 132, etc. (see, e.g., FIG. 2). The control system 308 can further control a position of the corresponding part of the end effector 100, relative to the surface, by selective control of various actuators or the manipulator arm.

Figure 6:
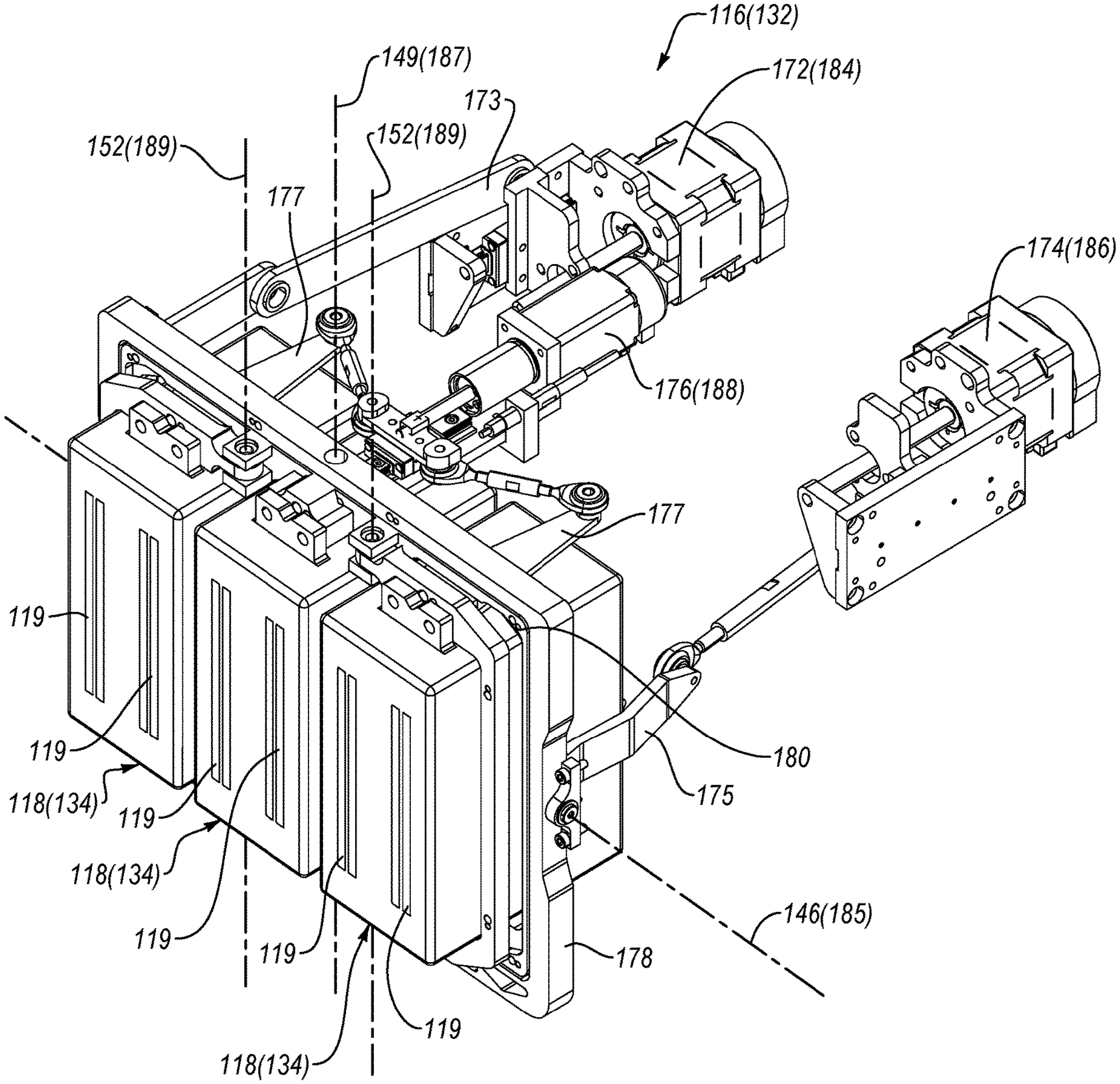
FIG. 6 is a schematic perspective view of a portion of a printing module, according to one or more examples of the present disclosure.

As previously disclosed, each one of the primary-printing modules 116 includes at least one primary printhead 118. In some examples, the primary-printing module 116 has three primary printheads 118, such as shown in FIG. 6. However, it should be recognized that a primary-printing module 116 having any number of printheads can be utilized, with each primary printhead 118 having one or more ink outlets 119. The primary printheads 118 are movable, relative to the primary-block body 114, about at least one axis of motion. As used herein, an axis of motion is a straight line around which an object rotates or moves, rotation can be in a clockwise and/or counterclockwise direction about the axis and movement may be lateral movement. The axis of motion may be about the x-axis, the y-axis or the z-axis, or may be another axis that is parallel, collinear, or non-parallel with the x-axis, the y-axis, or the z-axis. In some examples, the primary-printing module 116 has at least one axis of motion, such as a first axis 146, a second axis 149, or a third axis 152. In other examples, the primary-printing module 116 has at least two axes of motion, such as the first axis 146 and the second axis 149, as in the case of a primary-printing module 116 with only one primary printhead 118. In yet other examples, the primary-printing module 116 has at least three axes of motion, such that the primary-printing module 116 rotates about the first axis 146, the second axis 149, and at least one third axis 152.

In some examples, the primary-printing module 116 defines at least twenty-four axes of motion. As each primary-printing module 116 is movable, parallel to a z-axis and the at least one primary printhead 118 of each primary-printing module 116, in some examples, are rotatable about the first axis 146, the second axis 149 and the third axis 152, each primary-printing module 116 can have at least four axes of motion. Therefore, a primary block 102, as shown in FIG. 3, having six primary-printing module 116 defines at least twenty-four axes of motion. Furthermore, the end effector 100, as shown in FIG. 1, defines at least sixty-four axes of motion. Similar to the primary-printing modules 116, each one of the trailing-printing modules 132 can have at least four axes of motion. Additionally, each attachment system (as described below in reference to FIGS. 11 and 12) between coupled blocks includes at least two axes of motion. The end effector 100, as shown, has four attachment systems, with at least eight axes of motion attributed to the four attachment systems. Since each of the four trailing blocks have two trailing-printing modules 132, at least eight axes of motion are attributed to each one of the four trailing blocks. Therefore, the end effector 100 having a primary block 102 (defining twenty-four axes of motion), four trailing blocks (defining a total of thirty-two axes of motion), and four attachment systems (defining a total of eight axes of motion), defines at least sixty-four axes of motion.

Figure 7A:
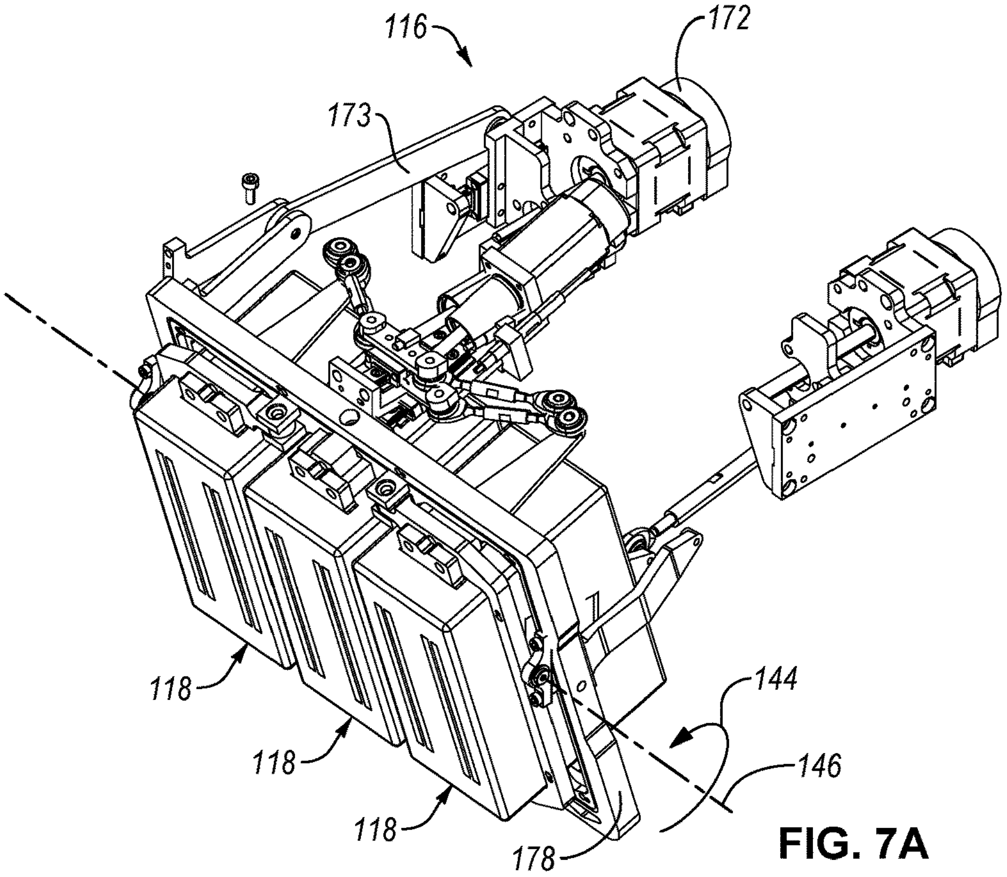
FIG. 7A is a schematic perspective view of a portion of the printing module of FIG. 6, with a plurality of printheads rotating in a first direction about a first axis, according to one or more examples of the present disclosure.
Figure 7B:
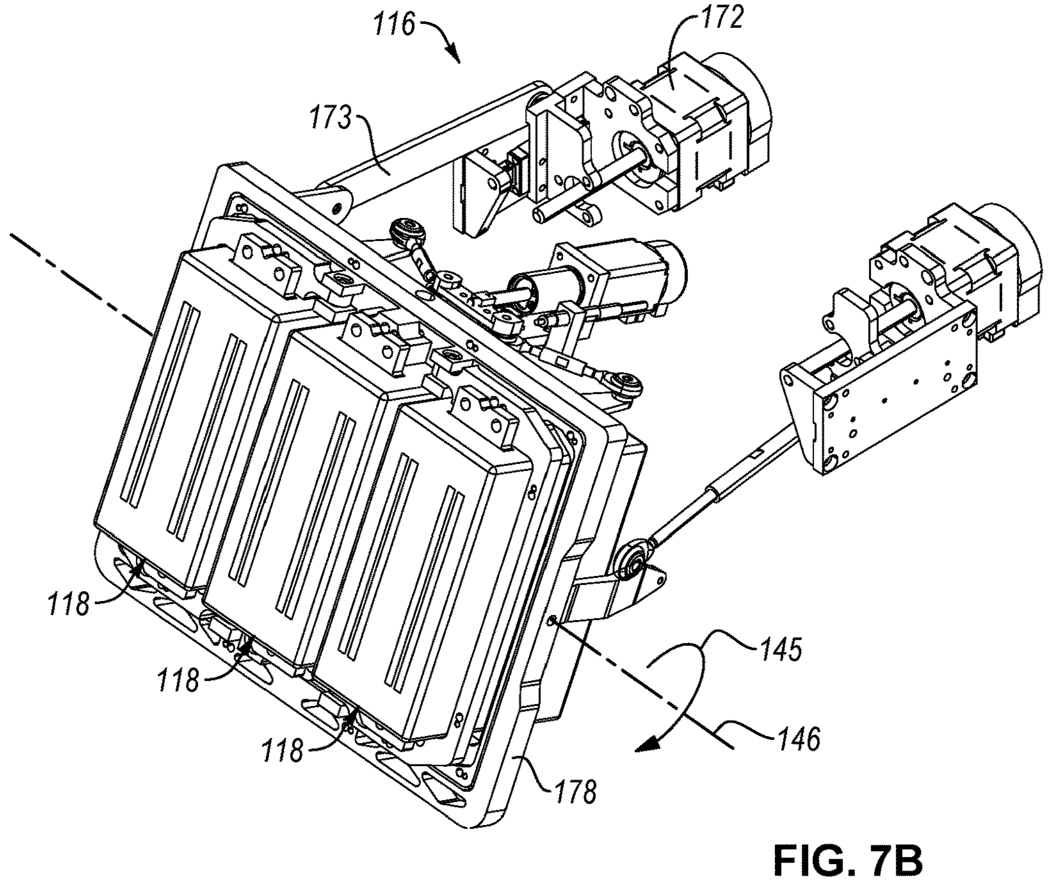
FIG. 7B is a schematic perspective view of the portion of the printing module of FIG. 6, with the plurality of printheads rotating in a second direction about the first axis, according to one or more examples of the present disclosure.

The first axis 146 extends through a midpoint of a width of the primary printhead 118 and parallel to or collinear with the x-axis. A second actuator 172 is configured to rotate (i.e., pivot) the at least one primary printhead 118, relative to the primary-block body 114, about the first axis 146. In some examples, the second actuator 172 is directly coupled to the at least one primary printhead 118. In other examples, the second actuator 172 is indirectly coupled to the at least one primary printhead 118, such that a first jointed-arm 173, coupled at one end to the second actuator 172, is coupled at the other end to an outer frame 178. The outer frame 178 entirely surrounds a perimeter of an inner frame 180, and the inner frame 180 entirely surrounds a perimeter of the at least one primary printhead 118. When the second actuator 172 is actuated, the first jointed-arm 173 is moved to rotate the at least one primary printhead 118. Accordingly, as the second actuator 172 is actuated, the outer frame 178, inner frame 180 and at least one primary printhead 118 co-rotate about the first axis 146. As shown in FIG. 7A, the second actuator 172 is actuated to rotate the at least one primary printhead 118 in a first direction 144 about the first axis 146. As shown in FIG. 7B, in other examples, the second actuator 172 is actuated to rotate the at least one primary printhead 118 in a second direction 145 about the first axis 146. The first direction 144 and the second direction 145 rotate the at least one primary printhead 118 in opposite directions, such that one direction is rotating in a clockwise direction and one direction is rotating in a counter-clockwise direction. In some examples, the second actuator 172 is configured to rotate the at least one primary printhead 118 in the first direction 144 and second direction 145 at a maximum of about ten-degrees from a neutral position.

Figure 8A:
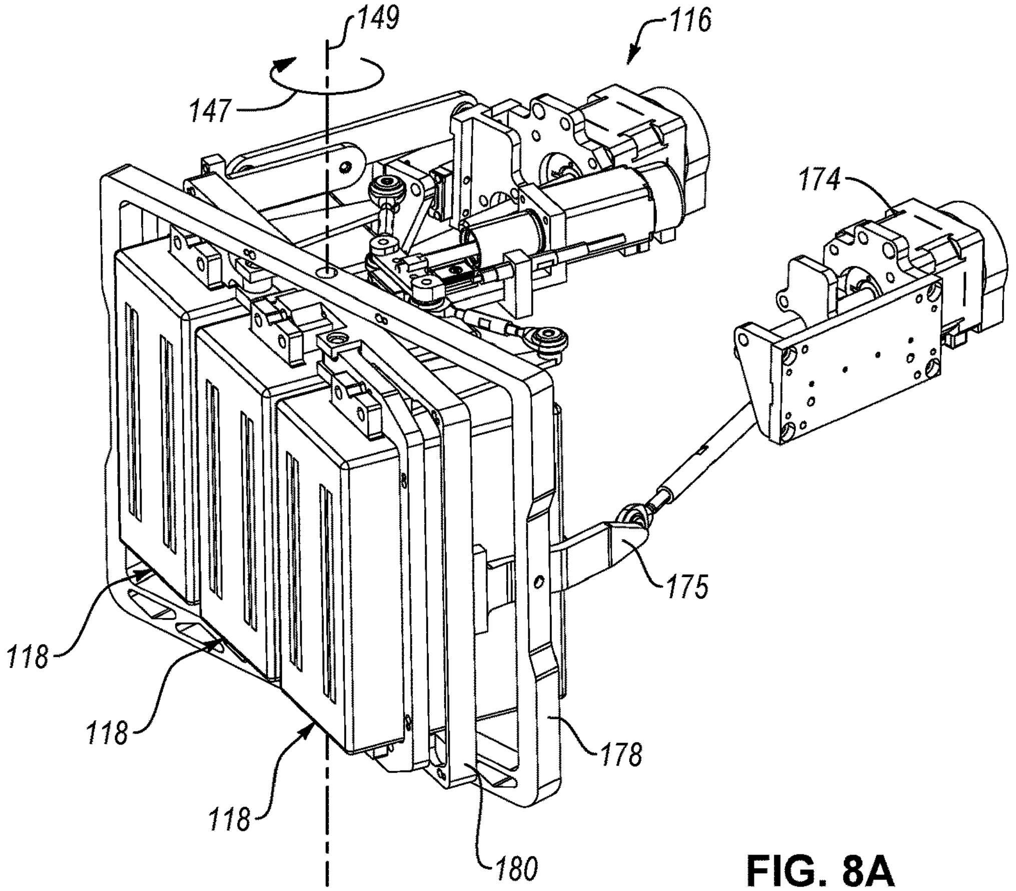
FIG. 8A is a schematic perspective view of a portion of the printing module of FIG. 6, with a plurality of printheads rotating in a third direction about a second axis, according to one or more examples of the present disclosure.
Figure 8B:
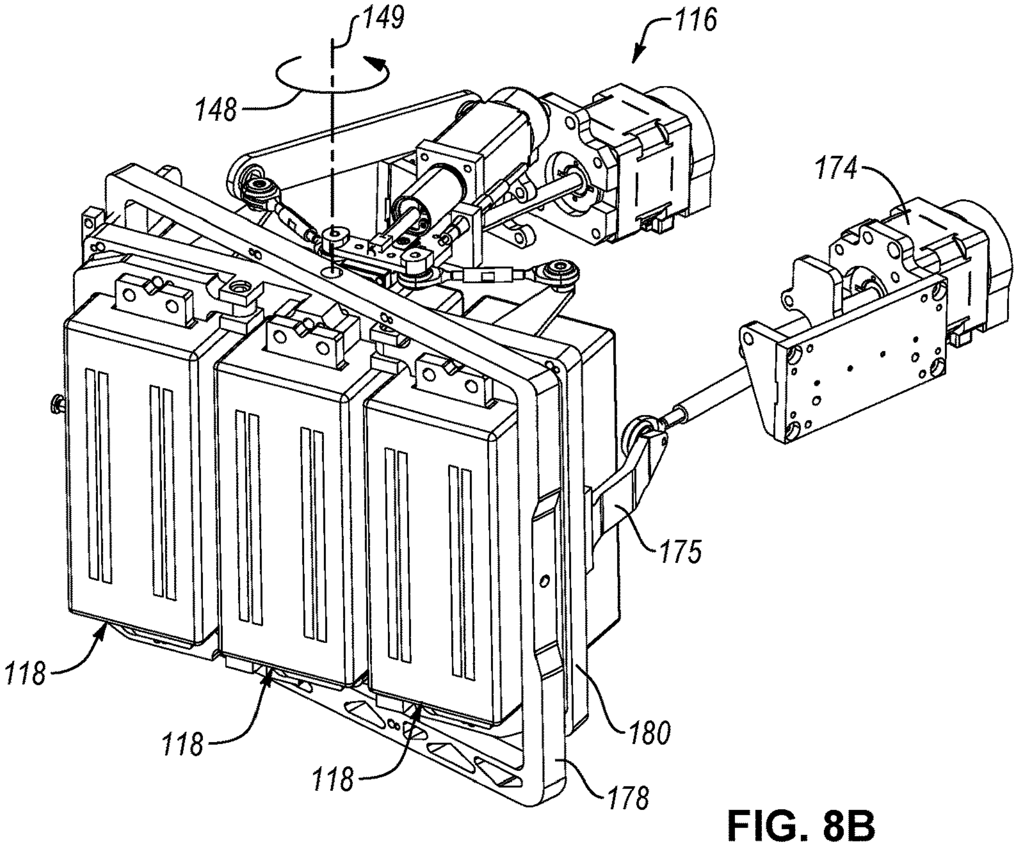
FIG. 8B is a schematic perspective view of the portion of the printing module of FIG. 6, with the plurality of printheads rotating in a fourth direction about the second axis, according to one or more examples of the present disclosure.

The second axis 149 extends through a midpoint of a length of the primary printhead 118 and parallel to or collinear with the y-axis, which is perpendicular to the z-axis. A third actuator 174 is configured to rotate the at least one primary printhead 118, relative to the primary-block body 114, about the second axis 149. In some examples, the third actuator 174 is directly coupled to the at least one primary printhead 118. In other examples, the third actuator 174 is indirectly coupled to the at least one primary printhead 118, such that a second jointed-arm 175, extends between the third actuator 174 and the at least one primary printhead 118. The second jointed-arm 175 is coupled at one end to the third actuator 174 and is coupled at the other end to the inner frame 180. When the third actuator 174 is actuated, the second jointed-arm 175 is moved to rotate the at least one primary printhead 118. Accordingly, as the third actuator 174 is actuated, the inner frame 180 and at least one primary printhead 118 co-rotate, relative to the outer frame 178, about the second axis 149. As shown in FIG. 8A, the third actuator 174 is actuated to rotate the at least one primary printhead 118 in a third direction 147 about the second axis 149. In some examples, as shown in FIG. 8B, the third actuator 174 is configured to rotate the at least one primary printhead 118 in a fourth direction 148 about the second axis 149. The third direction 147 and the fourth direction 148 are opposite directions, such that one direction is rotating in a clockwise direction and one direction is rotating in a counter-clockwise direction. In some examples, the third actuator 174 is configured to rotate the at least one primary printhead 118 in the third direction 147 and the fourth direction 148 at a maximum of about ten-degrees from a neutral position.

In examples where the primary-printing module 116 has at least two primary printheads 118, the third axis 152, or two parallel third axes 152, extend through the length of the primary printheads 118 and parallel to or collinear with the x-axis and the first axis 146. A fourth actuator 176 is configured to rotate at least one of the at least two primary printheads 118, relative to at least another one of the at least two primary printheads 118. In some examples, the fourth actuator 176 is directly coupled to one of the at least two primary printheads 118. In other examples, the fourth actuator 176 is indirectly coupled to one of the at least two primary printheads 118, such that a third jointed-arm 177, or set of third jointed-arms 177, extends between the fourth actuator 176 and at least one of the at least two primary printheads 118. The third jointed-arm 177 is coupled at one end to the fourth actuator 176 and is coupled at the other end to one of the at least two primary printhead 118. When the fourth actuator 176 is not actuated (i.e., the primary printheads 118 are in a neutral position) the at least two primary printheads 118 are co-planar, however once the fourth actuator 176 is actuated the at least two primary printheads 118 are not co-planar. When the fourth actuator 176 is actuated, the third jointed-arm 177 is moved to rotate one of the at least two primary printhead 118, relative to at least another one of the two primary printheads 118. Accordingly, as the fourth actuator 176 is actuated, the inner frame 180 and outer frame are stationary, while one of the at least two primary printhead 118 is rotated, relative to the inner frame 180, about the third axis 152.

Figure 9A:
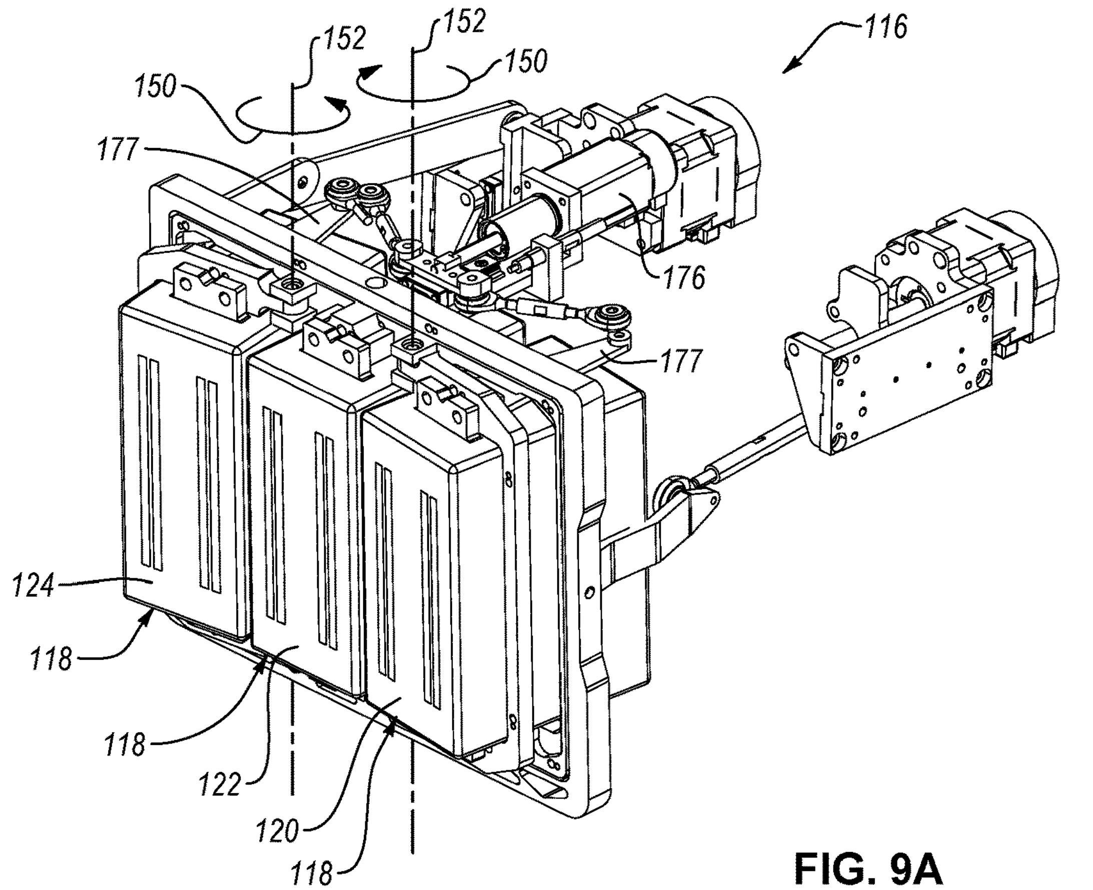
FIG. 9A is a schematic perspective view of a portion of the printing module of FIG. 6, with at least one printhead of a plurality of printheads rotating in a fifth direction about a third axis, according to one or more examples of the present disclosure.
Figure 9B:
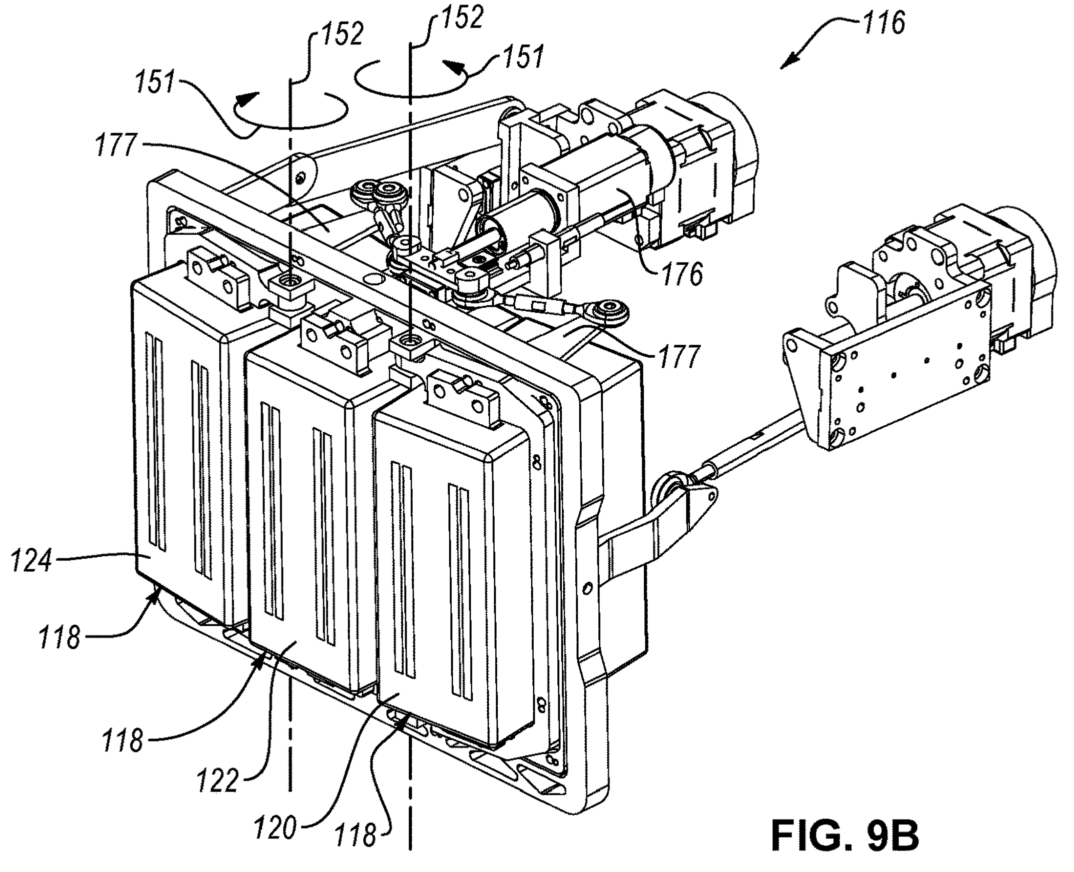
FIG. 9B is a schematic perspective view of the portion of the printing module of FIG. 6, with at least one printhead of the plurality of printheads rotating in a sixth direction about the third axis, according to one or more examples of the present disclosure.
Figure 10A:
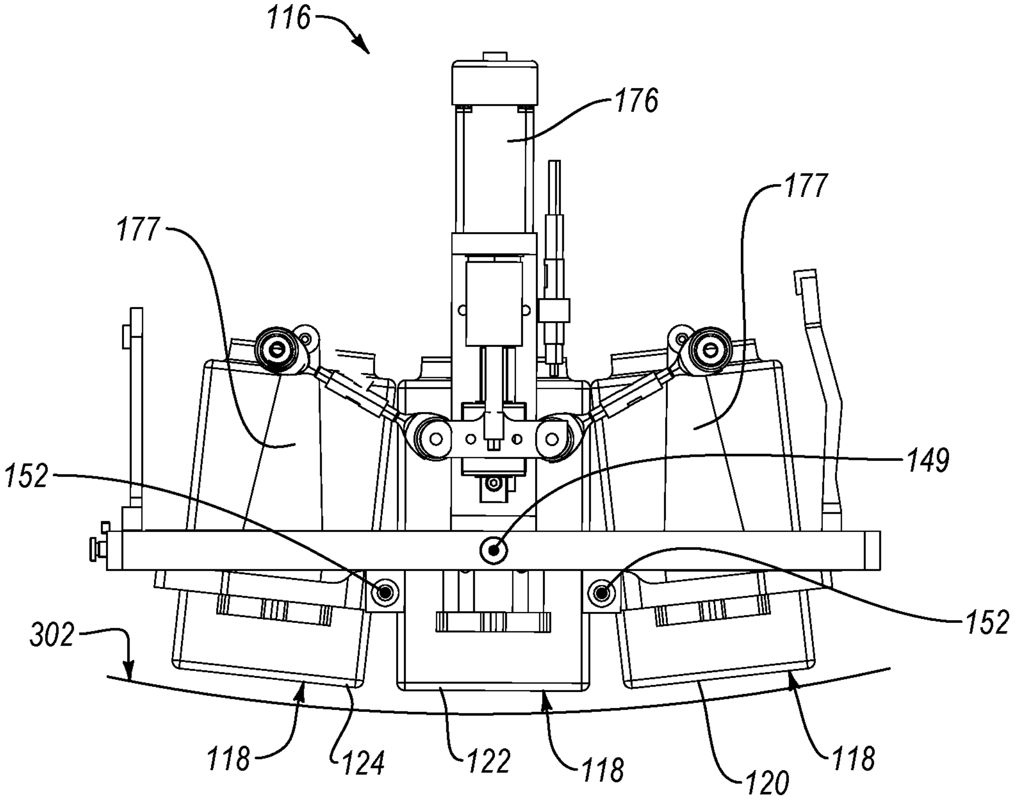
FIG. 10A is a schematic top elevation view of a portion of a printing module, with at least one printhead of a plurality of printheads rotating in a sixth direction about a third axis, the printing module on a surface, according to one or more examples of the present disclosure.
Figure 10B:
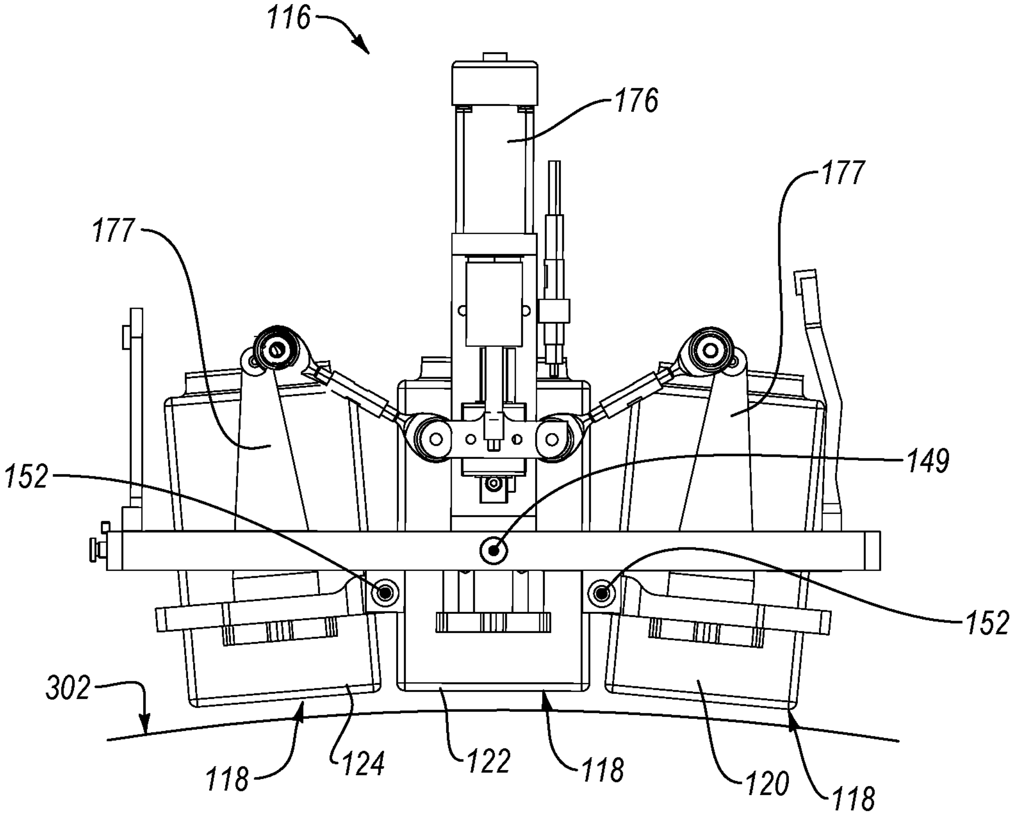
FIG. 10B is a schematic top elevation view of the portion of the printing module of FIG. 10A, with at least one printhead of the plurality of printheads rotating in a fifth direction about the third axis, the printing module on the surface, according to one or more examples of the present disclosure.

As shown in FIG. 9A, the fourth actuator 176 is actuated to rotate one of the at least two primary printheads 118 in a fifth direction 150 about the third axis 152. For example, in some cases, multiple third axes 152 are employed to rotate opposing primary printheads, such as the first primary printhead 120 and the third primary printhead 124, relative to a center primary printhead, such as the second primary printhead 122. As shown in FIG. 10B, the rotation of the primary printheads 118 about the multiple third axes 152 can be employed to mirror the contour of a surface 302, that has a convex geometry. For example, a convex surface having a 30-foot radius may require a −4-degree rotation in the fifth direction 150 about the multiple third axes 152. As shown in FIG. 9B, in some examples, the fourth actuator 176 is configured to rotate that at least one primary printhead 118 in a sixth direction 151 about the third axis 152. As shown in FIG. 10A, the rotation of the primary printheads 118 about the multiple third axes 152 can be employed to mirror the contour of a surface 302, that has a concave geometry. For example, a concave surface having a 30-foot radius may require a +4-degree rotation in the sixth direction 151 about the multiple third axes 152. In some examples, the fourth actuator 176 is configured to rotate the at least two primary printhead 118, relative to at least another one of the primary printheads 118 in the fifth direction 150 and the sixth direction 151 at a maximum of about five-degrees from a neutral position.

As the trailing-printing modules 132 have the same features as the primary-printing modules 116, the trailing-printing modules 132 also have at least one axis of motion. Referring to FIG. 6, a fourth axis 185 of the trailing-printing module 132 corresponds to the first axis 146 of the primary-printing module 116. A sixth actuator 184 of the trailing-printing module 132, corresponds to the second actuator 172 of the primary-printing module 116, and is configured to rotate the at least one trailing printhead 134 about the fourth axis 185. A fifth axis 187 of the trailing-printing module 132 corresponds to the second axis 149 of the primary-printing module 116. A seventh actuator 186 of the trailing-printing module 132, corresponds to the third actuator 174 of the primary-printing module 116, and is configured to rotate the at least one trailing printhead 134 about the fifth axis 187. Likewise, a sixth axis 189 of the trailing-printing module 132 corresponds to the third axis 152 of the primary-printing module 116. An eighth actuator 188 of the trailing-printing module 132, corresponds to the fourth actuator 176 of the primary-printing module 116, and is configured to rotate the at least one trailing printhead 134 about the sixth axis 189.

Figure 11:
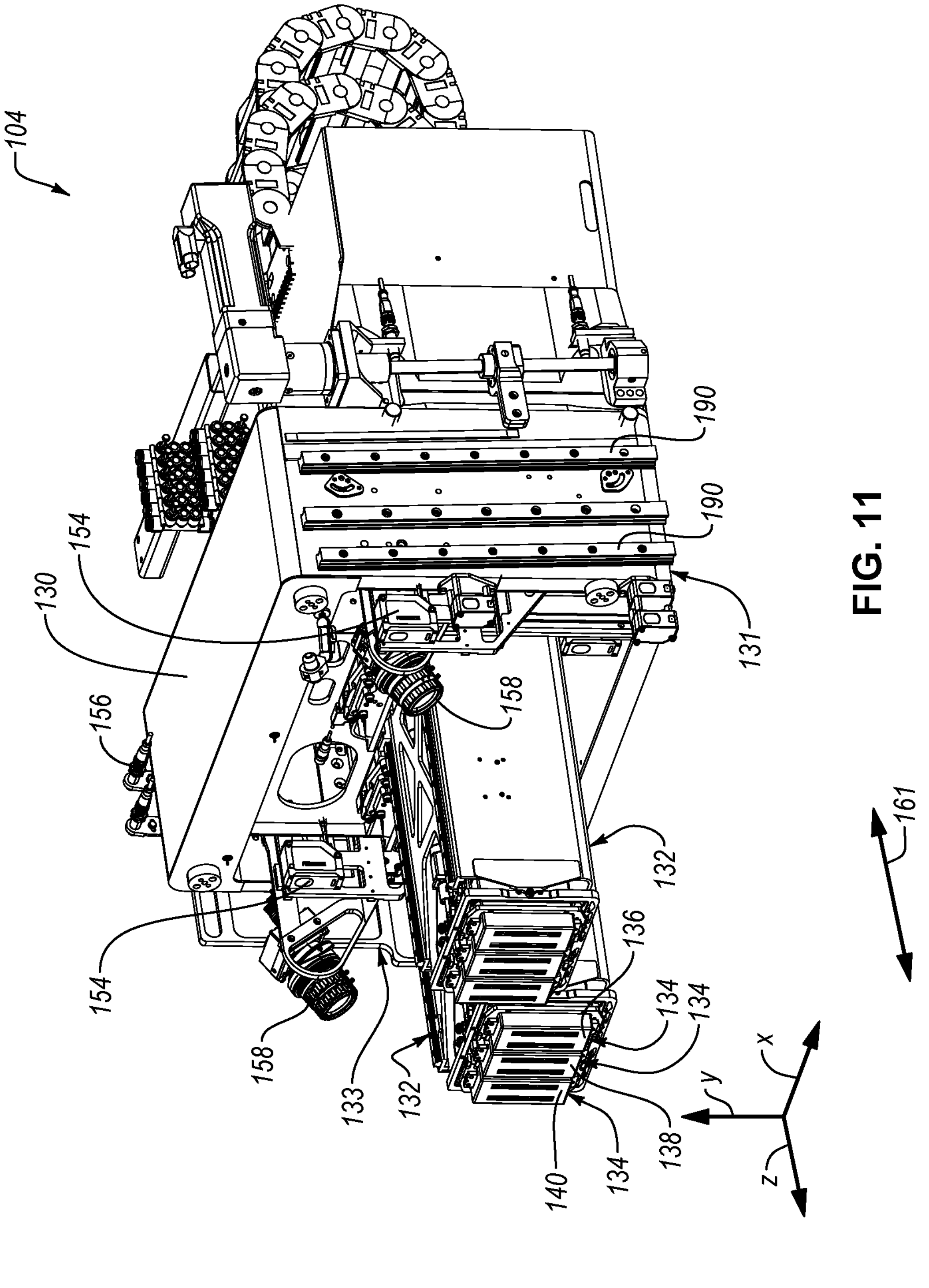
FIG. 11 is a schematic perspective view of a trailing block of an end effector, according to one of more examples of the present disclosure.
Figure 12:
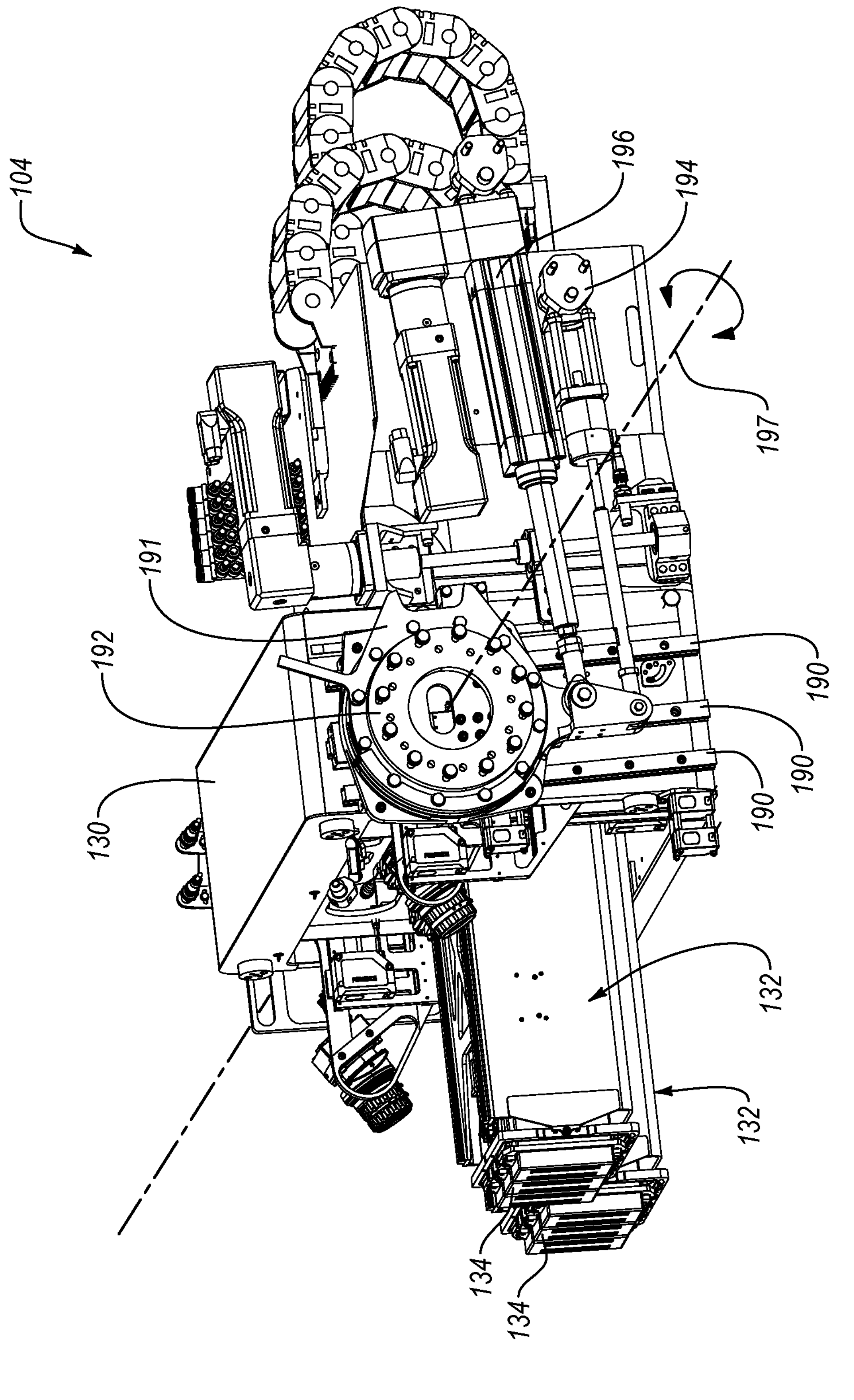
FIG. 12 is schematic perspective view of the trailing block of FIG. 11, according to one or more examples of the present disclosure.

Referring to FIGS. 11 and 12, the at least one trailing block 104 includes at least two trailing-printing modules 132. Each one of the trailing-printing modules 132 moves translationally in eighth directions 161, parallel to the second z-axis, and relative to the trailing-block body 130. A fifth actuator 182, substantially similar to the first actuator 160 shown in FIGS. 4 and 5, is coupled to each one of the trailing-printing modules 132 and operable to selectively extend and retract a corresponding one of the trailing-printing modules 132. When actuated, the fifth actuator 182 is configured to move the corresponding trailing-printing module 132, relative to the trailing-block body 130, parallel to the second z-axis. That is, when the end effector 100 is on a surface, the corresponding trailing-printing modules 132 is moved toward or away from the surface. Each one of the trailing-printing modules 132 is selectively movable, independent of any other one of the plurality of trailing-printing modules 132. Accordingly, the fifth actuators 182 are configured to independently adjust the locations of the plurality of trailing-printing modules 132 to conform to and follow a variety of surface geometries encountered along the surface.

The at least one trailing block 104, in some examples, further includes a plurality of sensors. The plurality of sensors are configured to provide location data and measurement data for the trailing block 104, relative to a surface, or in some cases, relative to other blocks of the end effector 100. The plurality of sensors may include but are not limited to cameras 158, laser distance sensors 154, and accelerometers 156. The trailing block 104 has at least one camera 158. In one example, the at least one camera 158 is located adjacent to a second leading side 131 of the trailing block 104. Additionally, or alternatively, in other examples, the at least one camera 158 is coupled to the trailing-block body 130, adjacent to a second trailing side 133 of the trailing block 104. Furthermore, the at least one trailing block 104 has at least one laser distance sensor 154 configured to measure a distance from the sensor to a surface. The distance data from the laser distance sensor can be used to determine the distance various parts of the at least one trailing block 104 are from a surface. For example, at least one laser distance sensor 154 may be located adjacent to the second leading side 131 or adjacent to the second trailing side 133 of the at least one trailing block 104. Laser distance sensors 154 may also be associated with individual trailing printheads 134 or individual trailing-printing modules 132. The at least one trailing block 104, in some examples, may also include at least one accelerometer 156, such as the accelerometer 156 located adjacent to the second trailing side 133. The at least one accelerometer 156 is used to detect an orientation of the at least one trailing block 104, relative to the surface and/or relative to the primary block 102. Real time adjustments can be made to the location and/or orientation of the at least one trailing block 104 based on the location data generated by the plurality of sensors. Additionally, or alternatively, real time adjustments can also be made on the trailing-printing modules 132 based on the location data generated by the plurality of sensors.

The primary block 102 is coupled to the at least one trailing block 104 via an attachment system. The attachment system includes at least one attachment rail 190, that can be fixed to one of the primary block 102 or the trailing block 104. The attachment system further includes a carriage 191, that is configured to slidably engage with the corresponding at least one attachment rail 190. The carriage 191 is fixed to the other one of the primary block 102 or the trailing block 104. When slidably engaged, the trailing block 104 is movably in a direction parallel to or collinear with the second y-axis, relative to the primary block 102. For example, as shown in FIG. 11, a plurality of attachment rails 190 are fixed to the second leading side 131 of the trailing block 104 and the plurality of attachment rails 190 are configured to slidably engage with a corresponding carriage 191 that is fixed to the trailing side 121 of the primary block 102 (see, e.g., FIG. 13). The carriage 191 is shown in FIG. 12, coupled to the at least one attachment rail 190. Although not shown, the carriage 191 is configured to be coupled with the primary block 102. The carriage 191 includes a rotary bearing 192 configured to be selectively rotatable about a seventh axis 197, that is parallel to or collinear with the second x-axis. A ninth actuator 194 is coupled to the carriage 191 and is operable to selectively extend and retract the trailing block 104, relative to the primary block 102, along at least one attachment rail 190 located on the trailing block 104. Additionally, a tenth actuator 196 is coupled to the carriage 191 and configured to rotate the trailing block 104, relative to the primary block 102, about the seventh axis 197.

Figure 13:
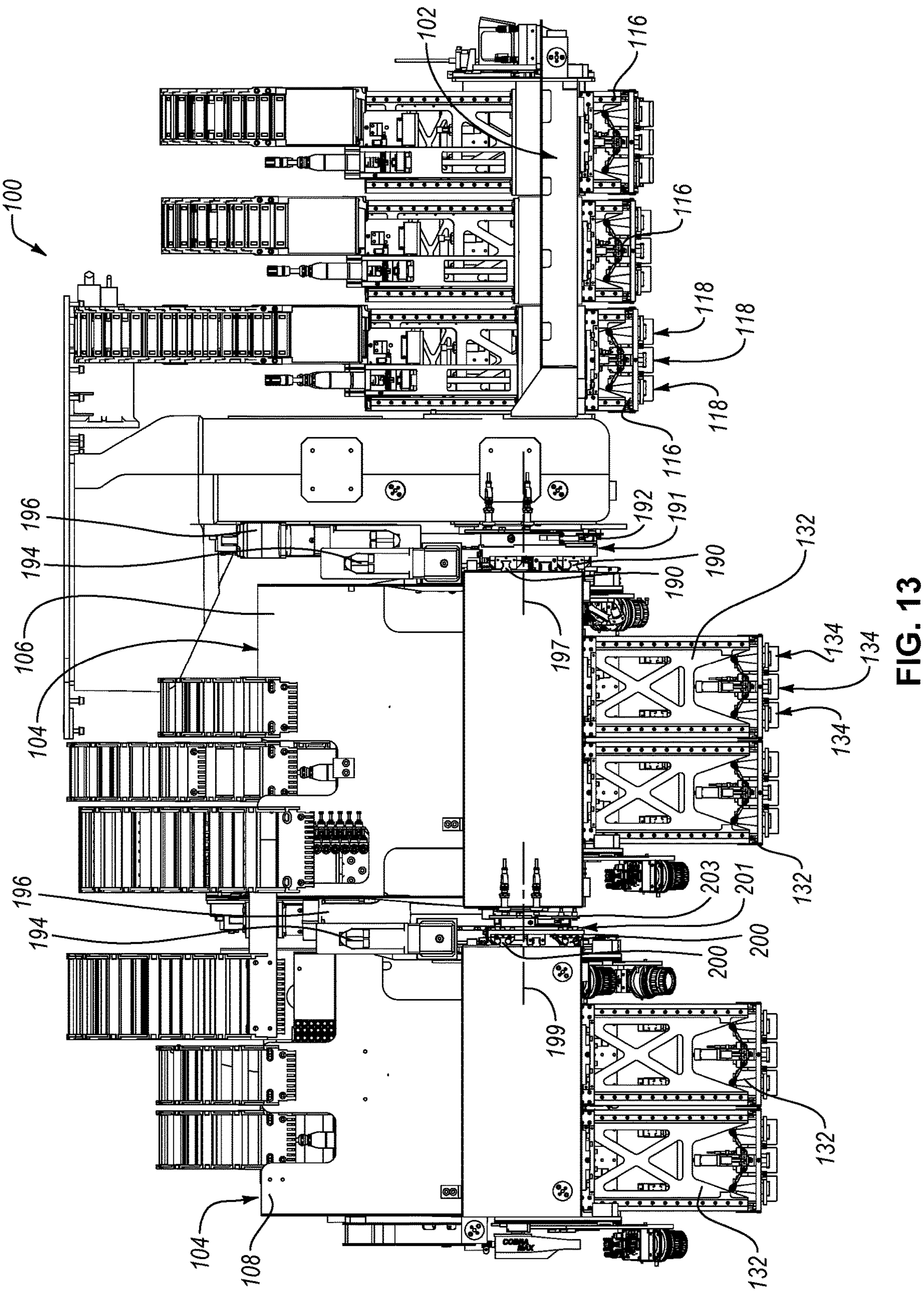
FIG. 13 is a schematic top elevation view of an end effector with a primary block and at least two trailing blocks, according to one or more examples of the present disclosure.

The attachment system, between the primary block 102 and the first upper trailing block 106, is shown in FIG. 13.

The at least one attachment rail 190 is fixed to the first upper trailing block 106 and the carriage 191, slidably engaged with the at least one attachment rail 190, is fixed to the primary block 102. The tenth actuator 196 coupled to the carriage 191, not shown, is configured to rotate the first upper trailing block 106, relative to the primary block 102, about the seventh axis 197. The ninth actuator 194 coupled to the carriage 191, not shown, is configured to selectively extend and retract the first upper trailing block 106, relative to the primary block 102, along the at least one attachment rail 190. Additionally, an attachment system, is located between the first upper trailing block 106 and the second upper trailing block 108. At least one trailing-attachment rail 200 is fixed to the second upper trailing block 108 and the trailing carriage 202, slidably engaged with the at least one trailing-attachment rail 200, is fixed to the first upper trailing block 106. The tenth actuator 196 coupled to the trailing carriage 202, not shown, is configured to rotate the second upper trailing block 108, relative to the first upper trailing block 106, about the eighth axis 199. The ninth actuator 194 coupled to the trailing carriage 202, not shown, is configured to selectively extend and retract the second upper trailing block 108, relative to the first upper trailing block 106, along the at least one trailing-attachment rail 200.

Figure 14:
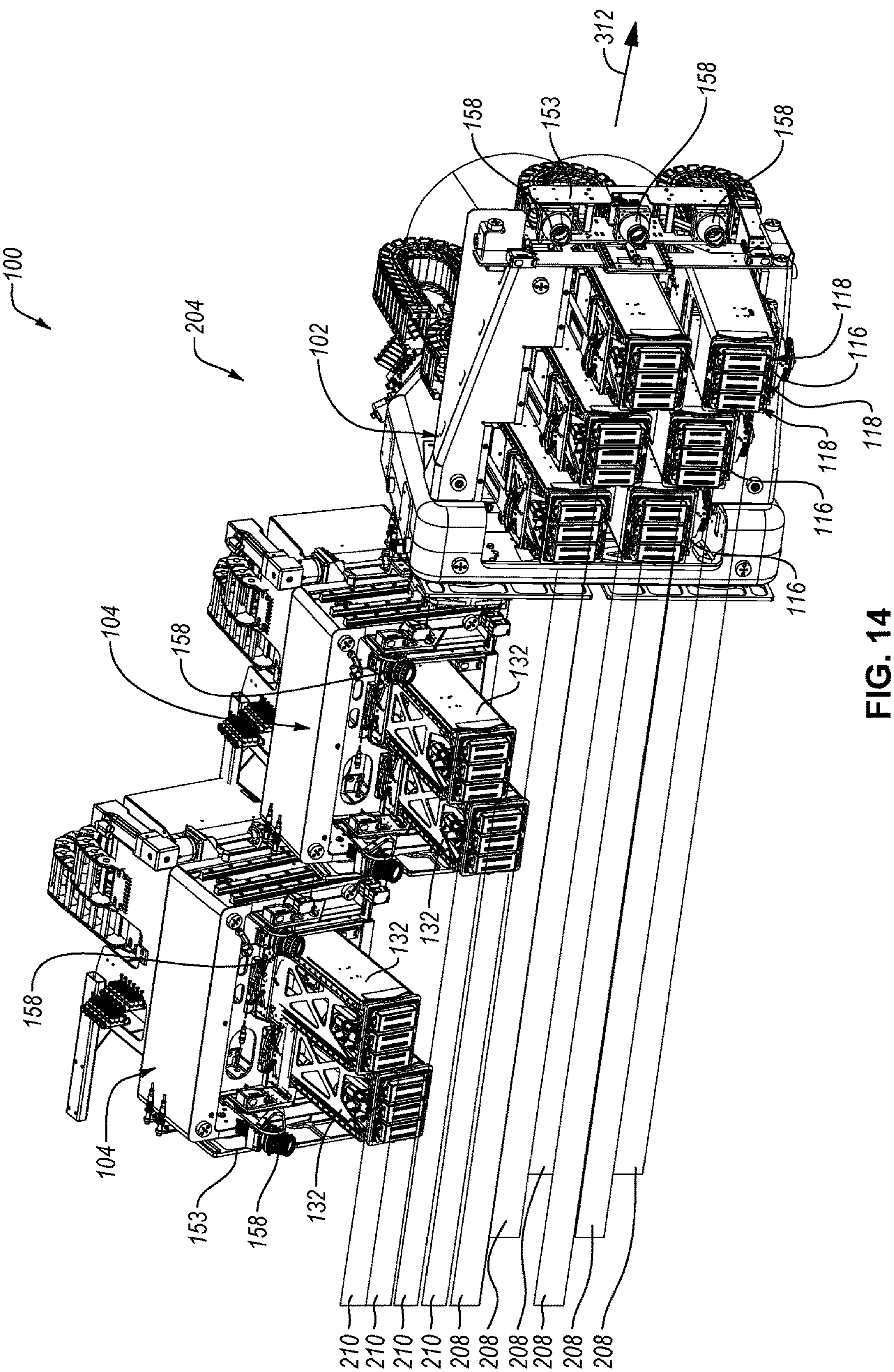
FIG. 14 is a schematic perspective view of an end effector with a primary block and two trailing blocks, the two trailing blocks in a fully-expanded position, according to one or more examples of the present disclosure.
Figure 15:
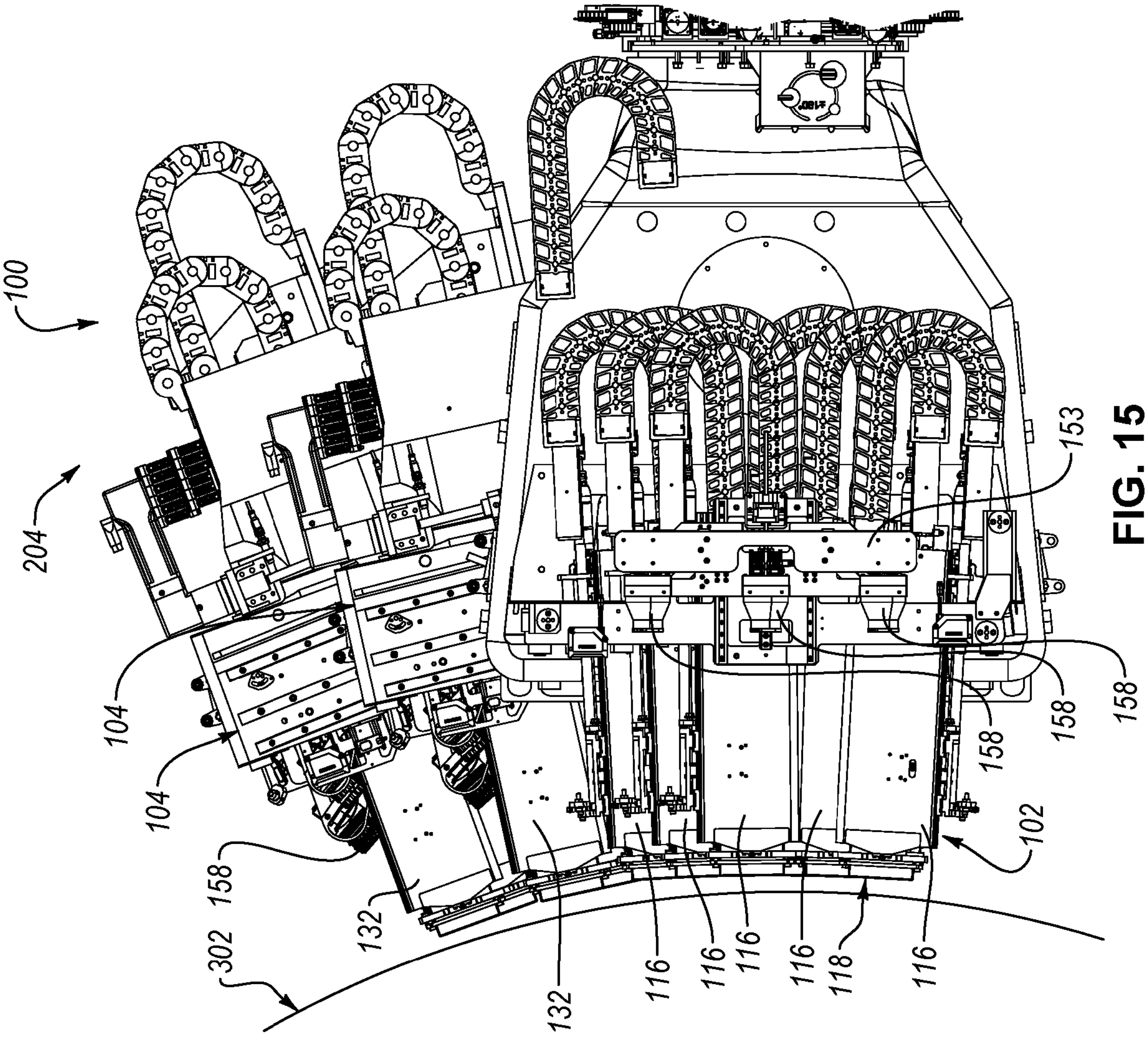
FIG. 15 is a schematic side view of an end effector printing ink on a surface of an object, according to one or more examples of the present disclosure.

Referring to FIGS. 14-17, the end effector 100 is moved along a surface while the end effector 100 is used to print ink on the surface. As shown, the end effector 100 includes a primary block 102, and two trailing blocks 104, a first upper trailing block 106 and a second upper trailing block 108, however, the end effector 100 could have any configuration includes a primary block only or a primary block with a combination of upper trailing blocks 105 and lower trailing blocks 107. In FIG. 14, the end effector 100 is in a fully-expanded position 204, such that the first upper trailing block 106 and the second upper trailing block 108 are expanded laterally outward, relative to the primary block 102, to an uttermost position along the corresponding at least one attachment rail parallel to or collinear with the second y-axis. The fully-expanded position 204 allows the end effector 100 to print a wide swath along the surface in a single pass. As shown in FIG. 15, the end effector of FIG. 14 is moving relative to the surface 302. The surface 302 in a convex surface and therefore the primary printheads 118 and the trailing printheads 134 have been adjusted accordingly to mirror the contours of the surface 302. The field of view of the plurality of cameras 158 and the light illuminating from the illuminators 153 in shown directed at the surface 302. As the end effector 100 is moved along the print path 312 (i.e., path preceding the end effector 100), the primary printheads 118 and the trailing printheads 134 print ink on the surface 302. A primary-printed path 208 (i.e., path subsequent to end effector 100) is printed by a corresponding one of the primary printheads 118 as the corresponding primary printhead moves across the surface 302. Likewise, a trailing-printed path 210 is printed by a corresponding one of the trailing printheads 134 as the corresponding trailing printhead moves across the surface 302. Due to the staggered (i.e., offset) design of the primary-printing modules 116 and the trailing-printing modules 132 the primary-printed paths 208 and the trailing-printed paths 210 together print a complete printed path with little to no spaces between the printed paths. In some examples, the primary-printed paths 208 and/or trailing-printed paths 210 may slightly or completely overlap, however in other examples, each path is immediately adjacent to the next path such that no spaces and no overlap occur between printed paths.

Figure 16:
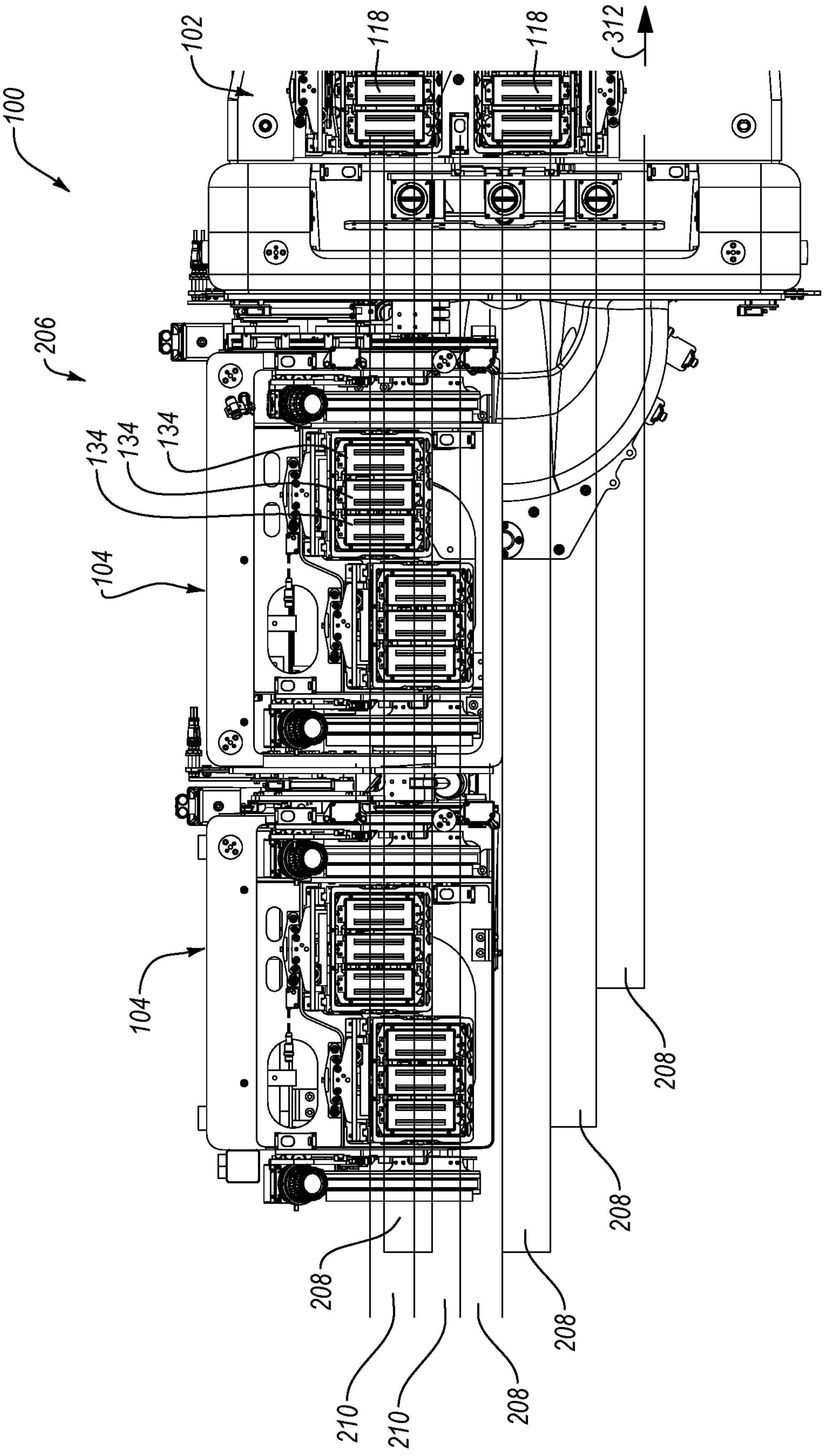
FIG. 16 is a schematic perspective view of an end effector with a primary block and two trailing blocks, the two trailing blocks in a fully-retracted position, according to one or more examples of the present disclosure.
Figure 17:
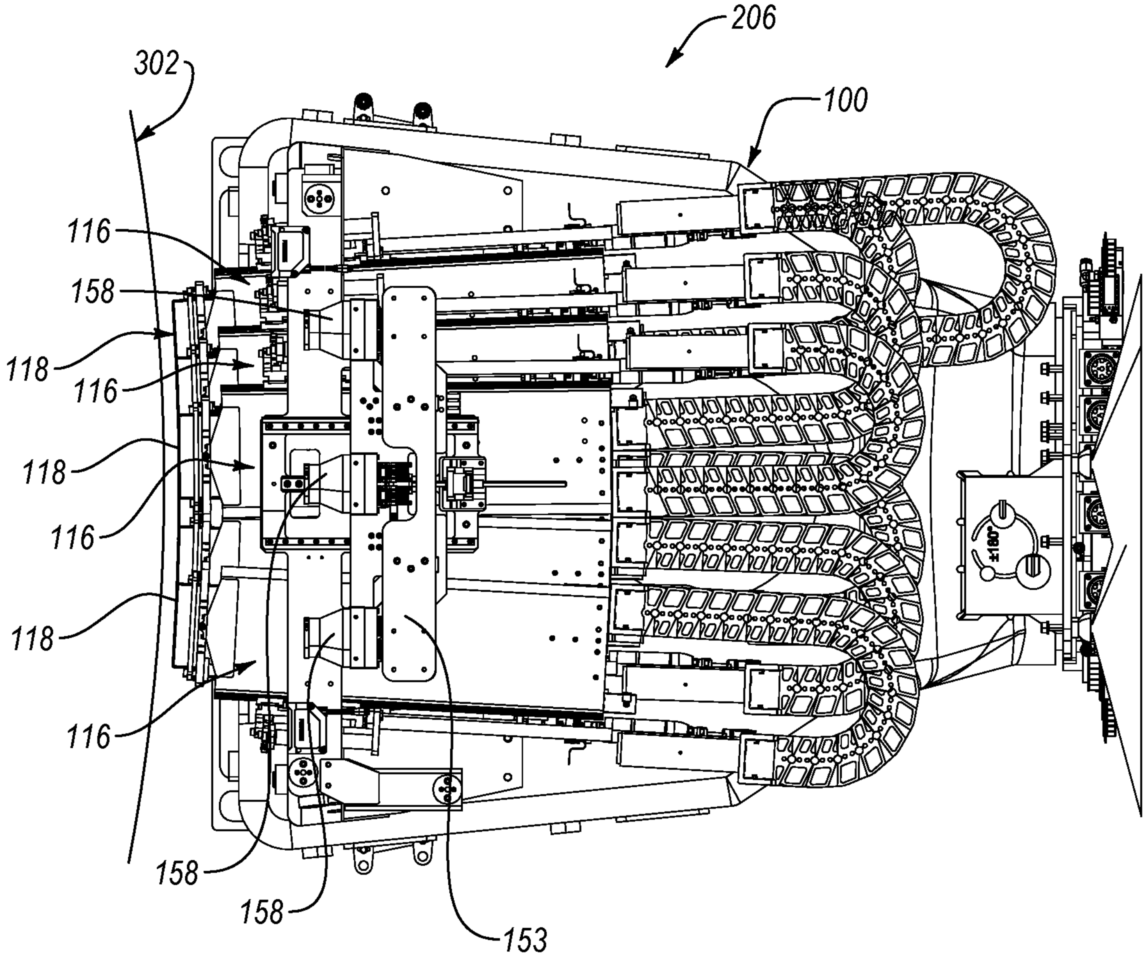
FIG. 17 is a schematic side view of the end effector of FIG. 16 printing on a surface of an object, according to one or more examples of the present disclosure.

In FIG. 16, the end effector 100 is in a fully-retracted position 206, such that the first upper trailing block 106 and the second upper trailing block 108 and retracted laterally inward, relatively to the primary block 102, to an innermost position along the corresponding at least one attachment rail, parallel to or collinear with the second y-axis. The fully-retracted position 206 allows the end effector 100 in print its narrowest swath along the surface in a single pass. The fully-retracted position 206 is useful in cases where obstructions or other features are along the print path 312, allowing the end effector 100 to continue printing along the print path 312 while avoid a collision with an obstructions or other feature. As shown in FIG. 17, the end effector of FIG. 16 is moving relative to the surface 302. The surface 302 is a convex surface and therefore the primary printheads 118 and the trailing printheads 134 have been adjusted accordingly to mirror the contours of the surface 302. As the end effector 100 is moved along the print path 312, the primary printheads 118 and the trailing printheads 134 print ink on the surface 302. The primary printheads 118 print a plurality of primary-printed paths 208 as the corresponding primary printheads move across the surface 302. Likewise, the trailing printheads 134 print a plurality of trailing-printed paths 210 as the corresponding trailing printheads move access the surface 302. Due to the staggered design of the primary-printing modules 116 and the trailing-printing modules 132 the primary-printed paths 208 and the trailing-printed paths 210, together, print a complete printed path with little to no spaces between the printed paths. In the fully-retracted position 206, some of the primary-printed paths 208 and the trailing-printing paths 210 overlap. Such that some of the printed path is printed by only the primary printheads 118, some of the printed path is printed by both the primary printheads 118 and the trailing printheads 134 (i.e., overlapping paths), and some of the printhead path is printed by the trailing printheads 134. In some examples, at least one primary printhead 118 or at least one trailing printhead 134 may be configured to stop dispensing ink during a period of overlapping printed path, such at only one at least one printhead is printing the corresponding printed path (i.e., no double printing).

Figure 18:
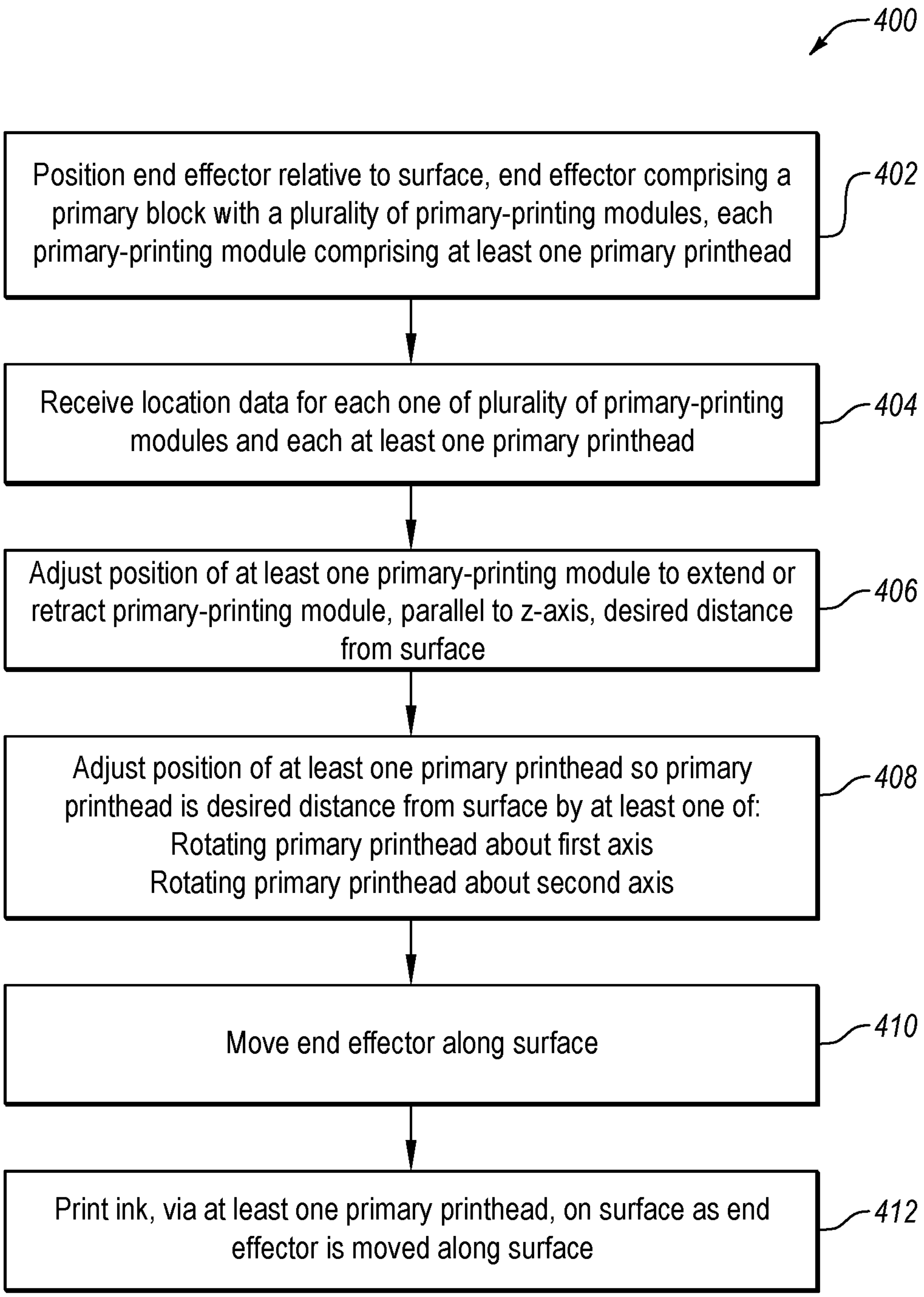
FIG. 18 is a schematic flow diagram of a method of printing on a surface of an object, according to one of more examples of the present disclosure.

Referring to FIG. 18, according to some examples, a method 400 of printing on a surface 302 in shown. The method 400 includes (block 402) positioning an end effector 100 relative to the surface 302. The end effector 100 includes a primary block 102 including a primary-block body 114 and a plurality of primary-printing modules 116 coupled to the primary-block body 114. Each one of the plurality of primary-printing modules 116 is translationally movable, parallel to a z-axis and relative to the primary-block body 114. Each one of the plurality of primary-printing modules 116 includes at least one primary printhead 118.

The method 400 also includes (block 404) receiving location data for each one of the plurality of primary-printing modules 116 and the at least one primary printhead 118. The primary block 102 includes a plurality of sensors that are configured to provide location data and measurement data for the end effector 100. The plurality of sensors may include cameras, distance sensors, accelerometers, encoders, and controllers. The plurality of sensors are configured to measure and received location data for at least one of the primary printheads 118, at least one primary-printing module 116, and/or the primary block 102. Controllers are configured to control the movement of the corresponding primary printhead 118, primary-printing module 116 or primary block 102. One of the plurality of sensors can be individually associated with one primary printhead 118 or one primary-printing modules 116 or shared between at least two primary printheads 118 or primary-printing modules 116.

The method further includes at least one adjusting the plurality of primary-printing modules 116 or adjusting the at least one primary printhead 118. Adjusting (block 406) the plurality of primary-printing modules 116 is done in response to the location data for each one of the plurality of primary-printing modules 116. The position of the plurality of primary-printing modules 116 is adjusted, relative to the primary-block body 114, to extend or retract at least one of the plurality of primary-printing modules 116, parallel to the z-axis so that the at least one plurality of primary-printing modules 116 is a desired distance away from the surface 302. Adjusting (block 408) the at least one primary printhead 118 is done in response to the location data for each one of the at least one primary printheads 118. A position of the at least one primary printhead is adjusted so that the at least one primary printhead 118 is a desired distance away from the surface 302. The desired distance can be achieved by at least one of rotating that at least one primary printhead 118, relative to the primary-block body 114, about a first axis 146 that is parallel to or collinear with an x-axis, which is perpendicular to the z-axis, or rotating the at least one primary printhead 118, relative to the primary-block body 114, about a second axis 149 that is parallel to or collinear with a y-axis, which is perpendicular to the x-axis and the z-axis. In some examples, the desired distances away from the surface 302 is the optimal distance away for printing ink on the surface. In other examples, the desired distances away is the optimal distance away for avoiding a collision on the surface.

The method 400 further includes (block 410) moving the end effector 100 along the surface 302. The end effector 100 is moved along the surface 302, parallel to the x-axis, along a print path 312. The print path 312 may be adjusted in real time using the data from the plurality of sensors.

The method 400 additionally includes (block 412) printing ink, via the at least one primary printhead 118, on the surface 302 as the end effector 100 is moved along the surface 302. In some examples, the method 400 further includes at least one trailing block 104 coupled to the primary block 102. The at least one trailing block 104 can be expanded laterally, relative to the primary block 102, to form an end effector 100 in a fully-expanded position, such as a v-block formation. The v-block formation can be formed by at least one upper trailing block 105 and one lower trailing block 107 extending laterally outward, relative to the primary block 102, together with the primary block 102 to form a V-shape. The fully-expanded position allows the end effector 100 to cover the widest swath along the surface 302 in a single pass. The at least one trailing block 104 can also be retracted laterally, relative to the primary block 102, to form the end effector 100 in a collapsed formation. The collapsed formation can be formed by the at least one trailing block 104 extending laterally inward, relative to the primary block 102, together with the primary block 102 to form an end effector 100 with aligned blocks, relative to the x-axis. The fully-retracted formation allows the end effector 100 to cover the narrowest swath along the surface 302 in a single pass. The end effector 100 can be adjusted to any position, between and inclusive of, the fully-expanded position and the fully-retracted position.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. An end effector for printing ink on a surface, the end effector comprising:
- a primary block comprising:
  - a primary-block body;
  - a plurality of primary-printing modules coupled to the primary-block body so that each one of the plurality of primary-printing modules is translationally movable, parallel to a z-axis and relative to the primary-block body; and
  - first actuators, each coupled to a corresponding one of the plurality of primary-printing modules and operable to selectively extend and retract the corresponding one of the plurality of primary-printing modules, parallel to the z-axis and relative to the primary-block body,
- wherein each one of the plurality of primary-printing modules comprises:
  - at least one primary printhead;
    - a second actuator configured to rotate the at least one primary printhead, relative to the primary-block body, about a first axis that is parallel to or collinear with an x-axis, which is perpendicular to the z-axis; and
    - a third actuator configured to rotate the at least one primary printhead, relative to the primary-block body, about a second axis that is parallel to or collinear with a y-axis, which is perpendicular to the x-axis and the z-axis.

2. The end effector of claim 1, wherein each one of the plurality of primary-printing modules further comprises:
- at least two primary printheads; and
- a fourth actuator configured to rotate at least one of the at least two primary printheads, relative to at least one other of the at least two primary printheads, about a third axis that is parallel to the second axis.

3. The end effector of claim 2, wherein each one of the plurality of primary-printing modules comprises at least three primary printheads.

4. The end effector of claim 1, wherein each one of the plurality of primary-printing modules is selectively movable, via actuation of the first actuator corresponding with each one of the plurality of primary-printing modules, independent of any other one of the plurality of primary-printing modules.

5. The end effector of claim 1, wherein:
- each one of the at least one primary printhead comprises two ink outlets;
- each one of the two ink outlets is configured to dispense ink having a color; and
- the color of the ink dispensed by one of the two ink outlets is different than the color of the ink dispensed by an other one of the two ink outlets.

6. The end effector of claim 5, wherein:
- each one of the plurality of primary-printing modules further comprises at least three primary printheads; and
- the color of the ink dispensed by any one of the two ink outlets is different than the color of the ink dispensed by any other one of the two ink outlets of any other one of the at least three primary printheads.

7. The end effector of claim 1, wherein the plurality of primary-printing modules comprises at least six primary-printing modules.

8. The end effector of claim 7, wherein:
- the at least six primary-printing modules are grouped into at least three sets of two primary-printing modules;
- the two primary-printing modules of each one of the at least three sets of primary-printing modules are aligned in a direction parallel to the y-axis; and
- the two primary-printing modules of each one of the at least three sets of primary-printing modules are offset, in a direction parallel to the x-axis, from the two primary-printing modules of any other one of the at least three sets of two primary-printing modules such that the at least three sets of two primary-printing modules are staggered.

9. The end effector of claim 1, wherein the plurality of primary-printing modules are staggered, in a direction parallel to the x-axis, from any other one of the plurality of primary-printing modules.

10. The end effector of claim 1, wherein the primary block defines at least twenty-four axes of motion.

11. The end effector of claim 1, wherein the end effector further comprises a trailing block coupled with the primary block so that the trailing block is movable relative to the primary block, wherein the trailing block comprises:
- a trailing-block body;
- a plurality of trailing-printing modules coupled to the trailing-block body so that each one of the plurality of trailing-printing modules is translationally movable, parallel to a second z-axis and relative to the trailing-block body; and
- a fifth actuator coupled to each one of the plurality of trailing-printing modules and operable to selectively extend and retract a corresponding one of the plurality of trailing-printing modules, parallel to the second z-axis and relative to the trailing-block body,
- wherein each one of the plurality of trailing-printing modules comprises:
  - at least one trailing printhead; and
  - at least one of:
    - a sixth actuator configured to rotate the at least one trailing printhead, relative to the trailing-block body, about a fourth axis that is parallel to or collinear with a second x-axis, which is perpendicular to the second z-axis; or a seventh actuator configured to rotate the at least one trailing printhead, relative to the trailing-block body, about a fifth axis that is parallel to or collinear with a second y-axis, which is perpendicular to the second x-axis and the second z-axis.

12. The end effector of claim 11, wherein each one of the plurality of trailing-printing modules comprises the sixth actuator and the seventh actuator.

13. The end effector of claim 11, wherein each one of the plurality of trailing-printing modules further comprises:

at least two trailing printheads; and an eighth actuator configured to rotate at least one of the two trailing printheads, relative to at least one other of the two trailing printheads, about a sixth axis that is parallel to the fifth axis.

14. The end effector of claim 11, wherein each one of the plurality of trailing-printing modules further comprises at least three trailing printheads.

15. The end effector of claim 11, wherein:

the primary block further comprises one of:

at least one attachment rail; or a carriage configured to slidably engage with the at least one attachment rail;

the trailing block further comprises at least the other one of:

the at least one attachment rail; or the carriage configured to slidably engage with the at least one attachment rail;

the carriage comprises a rotary bearing configured to be selectively rotatable about a seventh axis that is parallel to or collinear with the second x-axis;

a ninth actuator coupled to the carriage and operable to selectively extend and retract the trailing block, relative to the primary block, along the at least one attachment rail; and a tenth actuator coupled to the carriage and configured to rotate the trailing block, relative to the primary block, about the seventh axis.

16. The end effector of claim 11, wherein:

the end effector comprises a plurality of trailing blocks;

the plurality of trailing blocks comprises an upper trailing block coupled to a first portion of the primary block;

the plurality of trailing blocks further comprises a lower trailing block coupled to a second portion of the primary block; and the first portion is spaced apart from the second portion.

17. The end effector of claim 16, wherein:

the upper trailing block and the lower trailing block are positionable in any position, between and inclusive of, a fully-expanded position and a fully-retracted position;

when in the fully-expanded position the upper trailing block and the lower trailing block are expanded laterally, relative to the primary block, to form the end effector in a v-block formation; and when in the fully-retracted position the upper trailing block and the lower trailing block are retracted laterally, relative to the primary block, to form the end effector in a collapsed formation.

18. The end effector of claim 11, wherein:

the end effector comprises a plurality of trailing blocks;

the plurality of trailing blocks comprises a first upper trailing block, a second upper trailing block, a first lower trailing block, and a second lower trailing block;

the first upper trailing block is coupled directly to the primary block so that the first upper trailing block is movable relative to the primary block, and the second upper trailing block is coupled directly to the first upper trailing block so that the second upper trailing block is movable relative to the first upper trailing block; and the first lower trailing block is coupled directly to the primary block so that the first lower trailing block is movable relative to the primary block, and the second lower trailing block is coupled directly to the first lower trailing block so that the second lower trailing block is movable relative to the first lower trailing block.

19. The end effector of claim 18, wherein each one of the plurality of trailing blocks is selectively movable, via actuation of a corresponding one of a plurality of ninth actuators or a corresponding one of a plurality of tenth actuators, independent of any other one of the plurality of trailing blocks.

20. The end effector of claim 11, wherein the end effector defines at least sixty-four axes of motion.

21. The end effector of claim 11, wherein each one of the plurality of trailing-printing modules is selectively movable, via actuation of the fifth actuator corresponding with each one of the plurality of trailing-printing modules, independent of any other one of the plurality of trailing-printing modules.

22. The end effector of claim 11, wherein the plurality of trailing-printing modules are staggered, in a direction parallel to the second x-axis, from any other one of the plurality of trailing-printing modules.

23. A system for printing ink on a surface, the system comprising:

a manipulator arm;

an end effector removably attachable to the manipulator arm, wherein the end effector comprises a primary block comprising:

a primary-block body;

a plurality of primary-printing modules coupled to the primary-block body so that each one of the plurality of primary-printing modules is translationally movable, parallel to a z-axis and relative to the primary-block body;

first actuators, each coupled to a corresponding one of the plurality of primary-printing modules and operable to selectively extend and retract the corresponding one of the plurality of primary-printing modules, parallel to the z-axis and relative to the primary-block body, wherein each one of the plurality of primary-printing modules comprises:

at least one primary printhead;

a second actuator configured to rotate the at least one primary printhead, relative to the primary-block body, about a first axis that is parallel to or collinear with an x-axis, which is perpendicular to the z-axis; and a third actuator configured to rotate the at least one primary printhead, relative to the primary-block body, about a second axis that is parallel to or collinear with a y-axis, which is perpendicular to the x-axis and the z-axis; and a control system coupled to the end effector, wherein the control system is configured to receive data corresponding to at least a location of the primary block, relative to the surface, and to control a position of the primary block, relative to the surface and via selective control of the manipulator arm, in response to the data.

24. The system of claim 23, wherein the control system is further configured to receive second data corresponding to a location of each one of the plurality of primary-printing modules, relative to the surface, and to control a position of the at least one primary printhead of the corresponding one of the primary-printing modules, relative to the surface, based at least partially on the second data.

25. The system of claim 23, wherein the end effector further comprises a at least one trailing block coupled to the primary block so that the at least one trailing block is movable relative to the primary block, wherein the at least one trailing block comprises:

a trailing-block body;

a plurality of trailing-printing modules coupled to the trailing-block body so that each one of the plurality of trailing-printing modules is translationally movable, parallel to a second z-axis and relative to the trailing-block body; and a fifth actuator coupled to each one of the plurality of trailing-printing modules and operable to selectively extend and retract a corresponding one of the plurality of trailing-printing modules, parallel to the second z-axis and relative to the trailing-block body, wherein each one of the plurality of trailing-printing modules comprises:

at least one trailing printhead; and at least one of:

a sixth actuator configured to rotate the at least one trailing printhead, relative to the trailing-block body, about a fourth axis that is parallel to or collinear with a second x-axis, which is perpendicular to the second z-axis; or a seventh actuator configured to rotate the at least one trailing printhead, relative to the trailing-block body, about a fifth axis that is parallel to or collinear with a second y-axis, which is perpendicular to the second x-axis and the second z-axis; and wherein the control system is further configured to receive third data corresponding to at least a location of the trailing block, relative to the surface, and to control a position of the trailing block, relative to the surface, via selective control of the manipulator arm, in response to the third data.

26. The system of claim 25, wherein the control system is further configured to receive fourth data corresponding to a location of each one of the plurality of trailing-printing modules, relative to the surface, and to control a position of the corresponding at least one trailing printhead, relative to the surface, based at least partially on the fourth data.

27. The system of claim 23, wherein:

the control system is further configured to receive a print path;

the print path defines a path the end effector will follow along the surface; and the control system is further configured to adjust the print path, in real time, based at least partially on the data.

28. A method of printing ink on a surface, the method comprising:

positioning an end effector relative to the surface, wherein the end effector comprises a primary block comprising a primary-block body and a plurality of primary-printing modules coupled to the primary-block body so that each one of the plurality of primary-printing modules is translationally movable, parallel to a z-axis and relative to the primary-block body, and wherein each one of the plurality of primary-printing modules comprises at least one primary printhead;

receiving location data for each one of the plurality of primary-printing modules and the at least one primary printhead;

in response to the location data for each one of the plurality of primary-printing modules, adjusting a position of at least one of the plurality of primary-printing modules, relative to the primary-block body, to extend or retract at least one of the plurality of primary-printing modules, parallel to the z-axis so that the at least one plurality of primary-printing modules is a desired distance away from the surface;

in response to the location data of the at least one primary printhead, adjusting a position of the at least one primary printhead so that the at least one primary printhead is a desired distance away from the surface by:

rotating the at least one primary printhead, relative to the primary-block body, about a first axis that is parallel to or collinear with an x-axis, which is perpendicular to the z-axis; and rotating the at least one primary printhead, relative to the primary-block body, about a second axis that is parallel to or collinear with a y-axis, which is perpendicular to the x-axis and the z-axis;

moving the end effector along the surface; and printing ink, via the at least one primary printhead, on the surface as the end effector is moved along the surface.

* * * * *